(12) United States Patent
Jones et al.

(10) Patent No.: US 8,894,006 B2
(45) Date of Patent: Nov. 25, 2014

(54) MAN-PORTABLE, MULTI-MODE UNMANNED AERIAL SYSTEM LAUNCHER

(75) Inventors: John Charles Jones, Land O'Lakes, FL (US); Artem Igorevich Grigoryev, Lutz, FL (US); Luis Carlos Espinosa, Tampa, FL (US)

(73) Assignee: Wintec Arrowmaker, Inc., Fort Washington, MD (US)

( * ) Notice: Subject to any disclaimer, the term of this patent is extended or adjusted under 35 U.S.C. 154(b) by 475 days.

(21) Appl. No.: 13/450,887

(22) Filed: Apr. 19, 2012

(65) Prior Publication Data

US 2013/0277497 A1 Oct. 24, 2013

(51) Int. Cl.
B64F 1/04 (2006.01)
(52) U.S. Cl.
USPC .......................................................... 244/63
(58) Field of Classification Search
CPC ........ B64F 1/04; B64F 1/06; B64C 2201/082
USPC ........................... 244/63, 158.5, 171.3, 171.4
See application file for complete search history.

(56) References Cited

U.S. PATENT DOCUMENTS

| | | | |
|---|---|---|---|
| 3,968,947 A * | 7/1976 | Schlegel et al. ................. | 244/63 |
| 4,909,458 A | 3/1990 | Martin | |
| 5,695,153 A | 12/1997 | Britton et al. | |
| 6,457,673 B1 | 10/2002 | Miller | |
| 6,626,399 B2 * | 9/2003 | Young et al. ..................... | 244/63 |
| 6,851,647 B1 | 2/2005 | Rosenbaum et al. | |
| 7,556,219 B2 | 7/2009 | Page et al. | |
| 7,739,938 B2 | 6/2010 | Nair et al. | |
| 7,849,628 B2 | 12/2010 | Condon et al. | |
| 8,453,966 B2 * | 6/2013 | McGeer et al. ............. | 244/110 F |
| 2003/0116677 A1 | 6/2003 | Young et al. | |
| 2006/0086241 A1 | 4/2006 | Miller et al. | |
| 2006/0186266 A1 | 8/2006 | Kennedy | |
| 2007/0252034 A1 | 11/2007 | McGeer et al. | |
| 2008/0093501 A1 | 4/2008 | Miller et al. | |
| 2009/0134273 A1 | 5/2009 | Page et al. | |
| 2009/0314883 A1 | 12/2009 | Arlton et al. | |
| 2010/0096496 A1 | 4/2010 | Miller | |
| 2011/0062281 A1 | 3/2011 | Woolley et al. | |

OTHER PUBLICATIONS

Tasuma (UK) Ltd, "UAV Launchers: A3 Observer", Accessed via http://www.tasuma-uk.com/tasuma.php?p=40 on Mar. 9, 2012, p. 1.
Tasuma (UK Ltd, "UAV Launchers", Accessed via http://www.tasuma-uk.com/tasuma.php?p=3 on Mar. 9, 2012, pp. 1-2.

(Continued)

Primary Examiner — Brian M O'Hara
(74) Attorney, Agent, or Firm — Hultquist, PLLC; Mary B. Grant

(57) ABSTRACT

A man-portable unmanned aerial system launcher (UAS) launcher includes a rail assembly having an internal track and a carriage assembly having a base configured to translate within the internal track. The carriage assembly also includes a cradle configured to support a UAS and a bracket configured to support the cradle above the base. The UAS launcher includes a launch control system configured to secure the carriage assembly in the launch-ready position until the launch control system receives a launch signal. The UAS launcher also includes one or more elastic members configured to engage the carriage assembly and the rail assembly. Once the carriage assembly is translated to the launch-ready position, strain is applied to the carriage assembly by the one or more elastic members. Release of the carriage assembly enables force generated by strain of the elastic members to propel the carriage assembly toward a launch position.

42 Claims, 11 Drawing Sheets

(56) References Cited

OTHER PUBLICATIONS

Tasuma (UK) Ltd, "UAV Launchers: LTL 1", Accessed via http://www.tasuma-uk.com/tasuma.php?p=41 on Mar. 9, 2012, p. 1.
Tasuma (UK) Ltd, "UAV Launchers: TML 2", Accessed via http://www.tasuma-uk.com/tasuma.php?p=37 on Mar. 9, 2012, p. 1.
Tasuma (UK) Ltd, "UAV Launchers: TML 3", Accessed via http://www.tasuma-uk.com/tasuma.php?p=38 on Mar. 9, 2012, p. 1.
Tasuma (UK) Ltd, "UAV Launchers: TML 3 (Ultima Version)", Accessed via http://www.tasuma-uk.com/tasuma.php?p=42 on Mar. 9, 2012, p. 1.
Tasuma (UK) Ltd, "UAV Launchers: TML 4", Accessed via http://www.tasuma-uk.com/tasuma.php?p=39 on Mar. 9, 2012, p. 1.
Feb. 5, 2014 International Search Report and Written Opinion issued in International Patent Application No. PCT/US2013/036750.

* cited by examiner

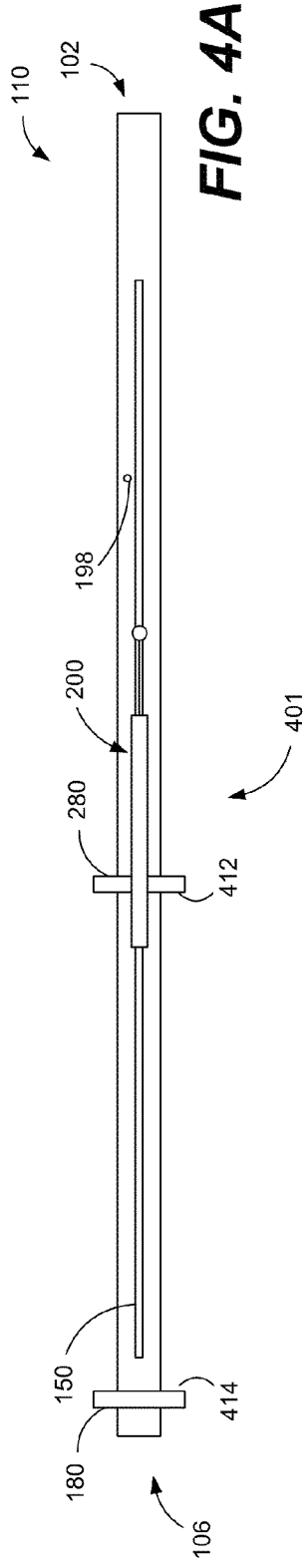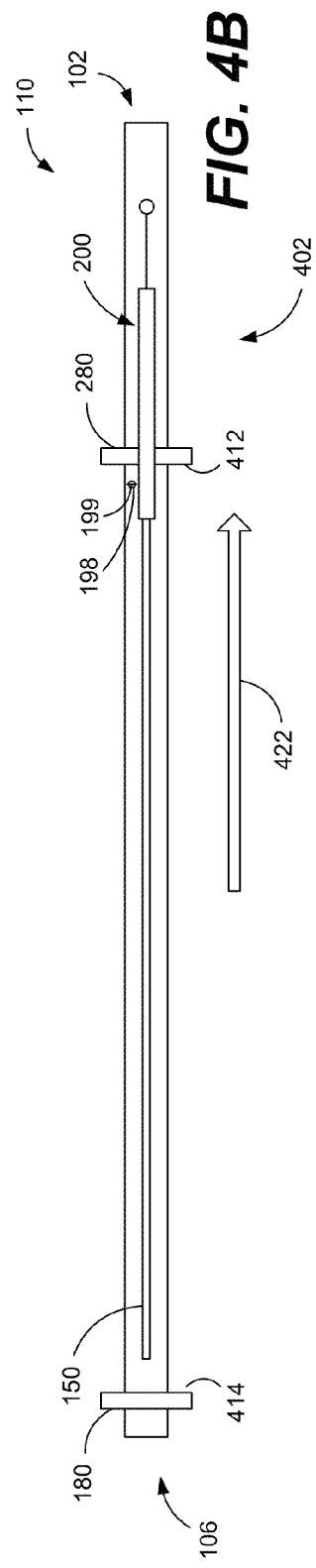

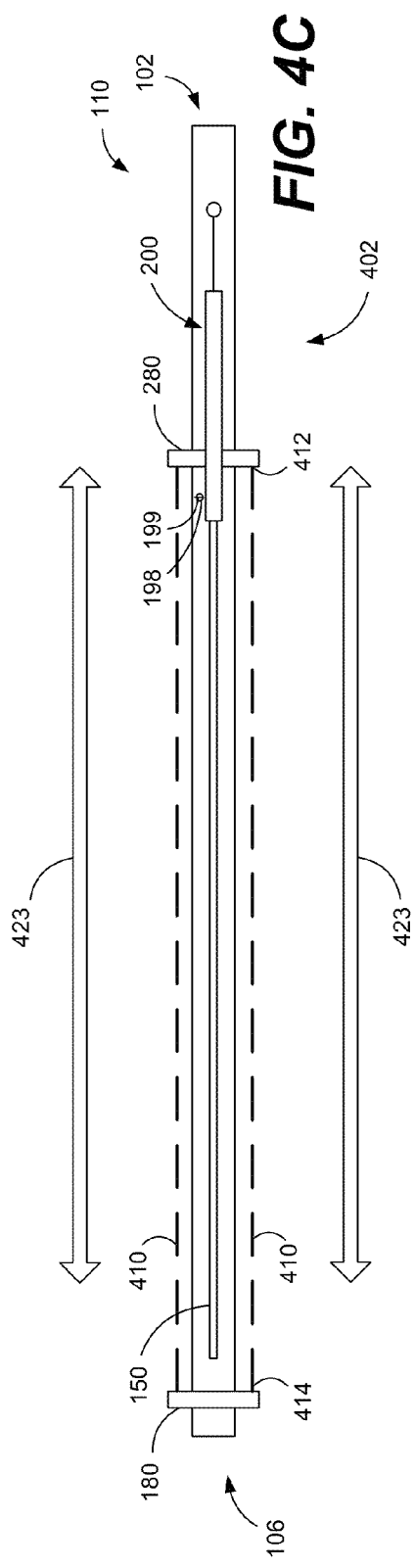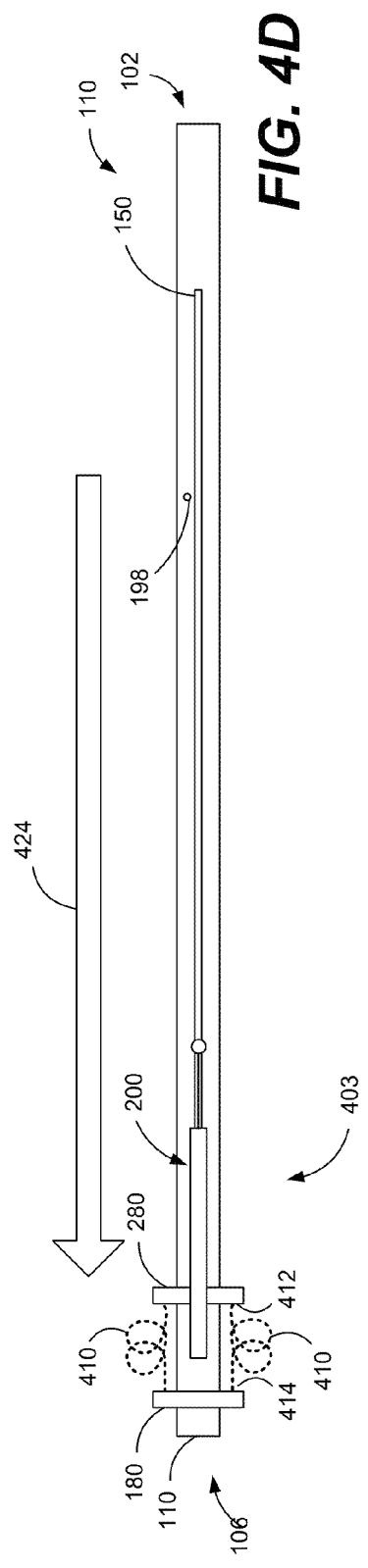

MAN-PORTABLE, MULTI-MODE UNMANNED AERIAL SYSTEM LAUNCHER

The present disclosure relates to launching of an unmanned aerial system (UAS). More specifically, the present disclosure relates to enabling different modes for preparing for and launching a UAS depending on a nature of a launch site and circumstances potentially affecting the launch.

BACKGROUND

An unmanned aerial system (UAS) may include any number of unmanned remotely-controlled or autonomous aerial vehicles that may be used to conduct reconnaissance, deliver a payload, or perform other airborne operations. Such vehicles include large vehicles that are launched from and landed on runways. Other such vehicles include medium-sized vehicles adapted to be launched from a trailer-mounted or other vehicle-mounted launching device. Another type of such vehicle is a small UAS, or "SUAS," which may include a small, lightweight aerial vehicle that may be "hand-launched" by a person throwing the UAS into the air. A small UAS provides an advantage in that it may be launched from locations or in situations where runways are not available and the launch site is not accessible to motor vehicles to deliver trailer-mounted or vehicle-mounted launching devices. For example, a small UAS may be transported to and launched from a small boat; from remote, rugged country; or from a rooftop.

Unfortunately, hand-launch of a UAS may not be a reliable way to launch a UAS. A threshold amount of strength and skill may be required to properly hand-launch a UAS. Moreover, even a skilled individual may fail to properly hand-launch an SUAS on a consistent basis. A single, improperly executed hand-launch may result in an aborted mission and damage to or loss of the UAS, damage to surrounding property, or injuries to personnel. Even when the person conducting the launch is skilled and exercises great care, the hand-launch may be disrupted by a distraction, a loss of footing, or any number of transient events that may undermine the launch.

Furthermore, although a UAS may be light enough in weight to be man-portable by one or more persons so that the UAS may be transported to a launch site that is not reachable by a vehicle, the UAS may be too bulky or too heavy to be hand-launched. Particularly in the case of a UAS that may be designed to operate at a high altitude, at high speed, to travel an extended range, or to carry a significant payload may simply be too large or too heavy to be hand-launched.

Existing UAS launch systems have a number of disadvantages. As previously mentioned, most launch systems are trailer-mounted or vehicle-mounted and, thus, may not be usable at many desired launch locations. In addition, large launch systems may require significant manpower to move, set up, operate, maintain, repair, and relocate with each use. Another disadvantage of large launch systems is that they may not be easily or quickly moved to account for changed conditions, such as advance of hostile forces or a change in prevailing wind. Such systems also may lack the ability to launch a UAS without being directly attended by an operator, which may subject the operator to danger or prevent launch of the UAS in the face of adverse conditions.

Finally, those of the catapult type are designed with an external rail and internal elastic/spring mechanism to translate the UAS to a launch position. The external rail can become subject to damage from normal transport and operations and exposure to the environment. In addition, the design of internal elastic/spring mechanisms results in the requirement for a winching, cranking, or pulley mechanism to translate the carriage assembly under strain to a launch ready position. This significantly complicates the operation and manufacture of the launcher and creates a hazard during the translation of the carriage to the launch ready position in that the carriage cannot be locked until it is fully retracted.

It would therefore be a significant advance in the art of UAS launch systems to provide reliable systems and methods to launch a man-portable UAS to provide for easy and flexible deployment, repositioning, and launch of a UAS under adverse or changing conditions.

SUMMARY

Embodiments of the present disclose provide unmanned aerial system (UAS) launchers and methods adapted for launch preparation and launch of a UAS that provide for flexibility in launching a UAS under adverse or changing conditions.

An embodiment of a man-portable UAS launcher may include a man-portable system weighing not more than 25 pounds (11.4 kilograms) to provide a sturdy and reliable system for launch of a man-portable UAS. The embodiment includes a rail assembly having an internal track to receive a carriage assembly that translates between a launch-ready position and a launch position within the internal track. Use of an internal track provides for translation of the carriage assembly that is not affected by damage to an exterior surface of the rail assembly or foreign matter adhered to the exterior surface of the rail assembly. Upon the carriage assembly being released by a launch control system, one or more elastic members propel the carriage assembly along the internal track of the rail assembly from the launch-ready position to the launch position to launch the UAS. Because of the man-portability of the UAS launcher, the UAS launcher may be transported to and used in locations that may not be reached by trailer-mounted or other vehicle-mounted UAS launchers, such as in remote or rugged terrain, on rooftops, or on small boats.

Another embodiment of a UAS launcher may include a rotatable mounting system that includes a mount that supports a coupling configured to rotatably engage the rail assembly. A wind vane may be secured to the rail assembly adjacent to an end of the rail assembly opposite an end from which the UAS is launched. The wind vane may be configured to be driven in a downwind direction when impinged upon by a prevailing wind, thereby causing the opposite end from which the UAS is launched to face upwind into the prevailing wind. Thus, the second end of the rail assembly automatically rotates the UAS launcher to automatically direct a UAS to be launched into the prevailing wind.

Another embodiment of a UAS launcher includes a launcher that includes a multi-mode launch control system. The multi-mode launch control system may be secured to the rail assembly and be configured to secure the carriage assembly in the launch-ready position until the multi-mode launch control system receives a signal directing release of the carriage assembly. The multi-mode launch control system is configured to release the carriage assembly in response to a mechanical input, a wired electrical input, and a wireless electrical input. Thus, depending on conditions at the launch site and other considerations, a UAS may be launched locally through the use of a mechanical device or electrical device or launched remotely by sending a signal from a computer system or a wireless communications device.

An embodiment of a method of preparing a UAS for launch includes providing a UAS launcher configured to launch a UAS by translating a carriage assembly relative to a rail assembly between a launch-ready position adjacent a first end of the rail assembly and a launch position adjacent a second end of the rail assembly. The rail assembly is secured directly to a surface unless a site-specific wind condition is determined to be potentially disruptive to the launch of the UAS. When the site-specific wind condition is determined to be potentially disruptive to the launch of the UAS, the rail assembly is rotatably secured to a mount. The rail assembly is configured to rotate within the mount in response to the site-specific wind condition so that the second end of the rail assembly automatically rotates so that the launch position faces upwind.

Another embodiment of a method of preparing a UAS for launch includes providing a UAS launcher configured to launch a UAS by translating a carriage assembly relative to a rail assembly in response to a receiving a launch signal. The launch signal may be provided in any of a plurality of forms including of a mechanical launch signal, an electrical launch signal provided via a wired connection, and an electrical launch signal provided via a wireless connection. A form of the launch signal to be provided is selected from the plurality of forms based on a site-specific condition.

An embodiment of a method of launching a UAS is based on a condition. A UAS launcher is provided to launch a UAS by translating a carriage assembly relative to a rail assembly in response to a launch signal. The launch signal may be provided in any of a plurality of forms including a mechanical signal, an electrical signal provided via a wired connection, and an electrical signal provided via a wireless connection. The form of the launch signal to be provided is selected from the plurality of forms based upon a condition at a time of launch.

BRIEF DESCRIPTION OF THE DRAWINGS

FIGS. 4A-4D are top views of the carriage assembly being motivated from a non-launch-ready position to translate along the rail assembly into a launch-ready position, elastic members being coupled to the carriage assembly and the rail assembly, and then the carriage assembly being released to enable the carriage assembly to be propelled to a launch position;

DETAILED DESCRIPTION

The unmanned aerial system (UAS) launchers and methods of the present disclosure provide for flexible deployment, repositioning and launch of a UAS under adverse or changing conditions. Embodiments of the UAS launcher include man-portable UAS launchers, UAS launchers configured to automatically adjust for changes in direction of a prevailing wind, and UAS launchers that include a multi-mode launch control system for launching a UAS in response to any of a plurality of forms of launch signals. Methods of preparing a UAS for launch include selectively mounting a UAS launcher at a predetermined orientation or, when site-specific wind conditions so dictate, rotatably mounting the UAS launcher to respond to prevailing wind direction. Methods of preparing a UAS for launch also include selecting a form of launch signal based on site-specific conditions. Methods of launching a UAS includes a form of launch signal based on based on a condition at a time of launch.

Figure 1:
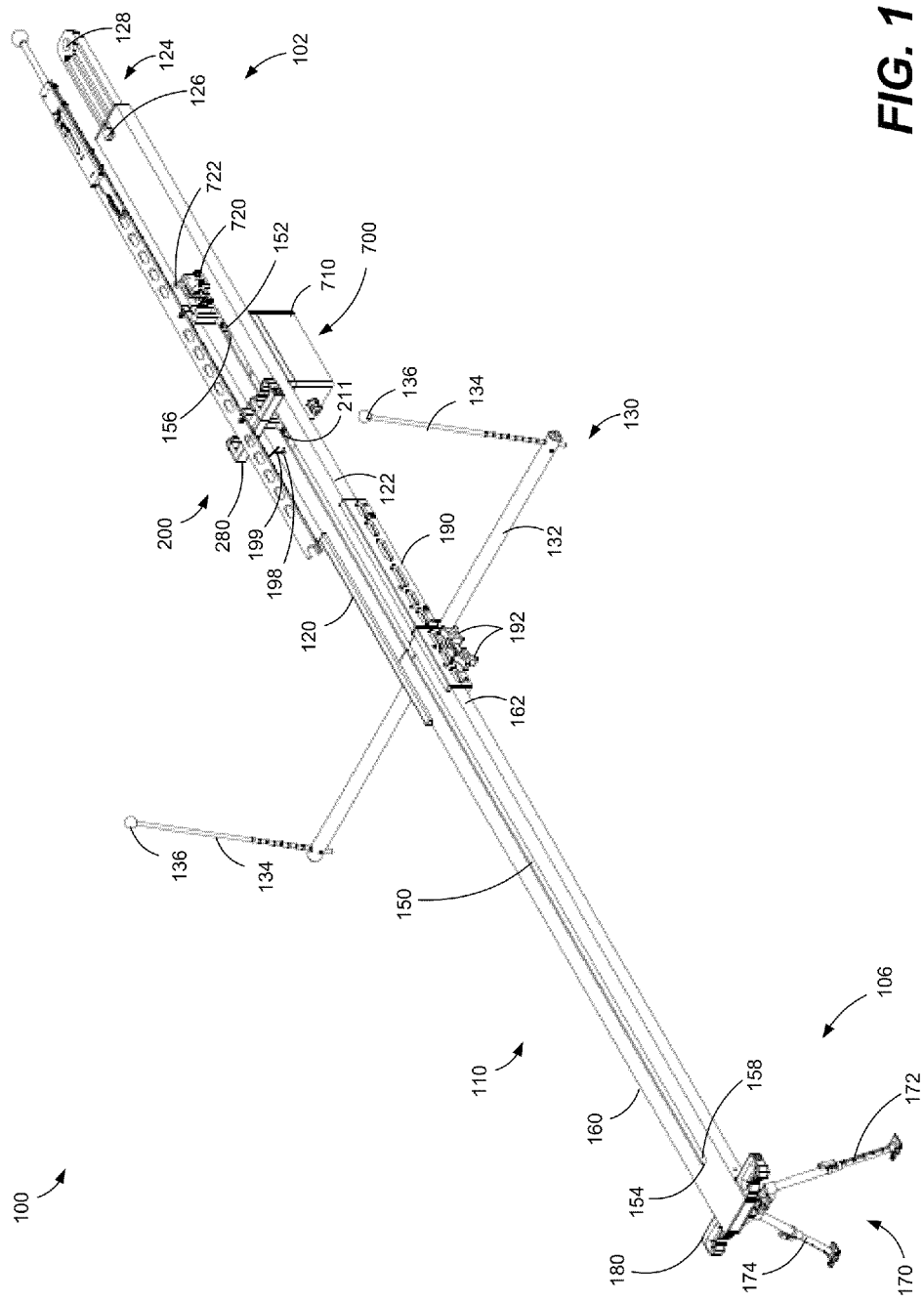
FIG. 1 is a perspective view of an embodiment of an unmanned aerial system (UAS) launcher including a rail assembly and a carriage assembly.

FIG. 1 depicts an embodiment of a UAS launcher 100. The UAS launcher 100 includes three principal assemblies including a rail assembly 110, a carriage assembly 200, and a launch control system 700. Each of the assemblies is explained in further detail, below. The rail assembly 110 includes a first end 102 and a second end 106. As further explained below, the carriage assembly 200 translates relative to the rail assembly 110 between a launch-ready position adjacent the first end 102 of the rail assembly and a launch position adjacent the second end 106 of the rail assembly.

Translation of the carriage assembly 200 to the launch-ready position prepares the carriage assembly 200 for launch. As further described below with reference to FIGS. 4A-4D, in one embodiment, one or more elastic members (not shown in FIG. 1) engage both the rail assembly 110 and the carriage assembly 200. In a particular embodiment, the carriage assembly 200 is translated to the launch-ready position, then the elastic members are coupled to the rail assembly 110 and the carriage assembly 200. After the carriage assembly 200 is locked into the launch ready position through the use of the launch control system 700, as further described below, the elastic members may be coupled to the rail assembly 110 and the carriage assembly 200 one at a time or simultaneously. Attachment of the elastic members puts a strain on the carriage assembly 200 relative to the carriage assembly 110, and release of this strain is used to propel the UAS into the air for launch.

As further described below with reference to FIGS. 4A-4D, attaching the elastic members after the carriage assembly 200 is secured in the launch-ready position eliminates the strain that the elastic members place on the carriage assembly 200 while the carriage assembly 200 is moved into the launch-ready position. Avoiding the strain of the elastic members on the carriage assembly while moving the carriage assembly 200 into the launch position thus reduces or eliminates a need for a winching, cranking, or pulley system that may be desired to translate the carriage assembly 200 to the launch ready position if the carriage assembly 200 were subject to strain of the elastic members. After the carriage assembly 200 is secured in the launch ready position and the elastic members are attached to the rail assembly 110 and the carriage assembly 200, releasing the carriage assembly 200 from the launch-ready position (e.g., via the launch control system 700) propels the carriage assembly 200 toward a launch position, causing the UAS to be launched into the air.

The rail assembly 110 includes one or more launch rails. As shown in the embodiment of FIG. 1, the rail assembly 110 includes a first launch rail 120 and a second launch rail 160. Alternatively, the rail assembly 110 may include a single rail assembly or may include more than two launch rails. The number or launch rails may be made as a design choice depending on a desired length limitation for any of the components of the UAS launcher, a desired rigidity of the rail assembly 110, and other factors. In the embodiment of FIG. 1, the first launch rail 120 and the second launch rail 160 are coupled together by a clamp 190. The clamp 190 is fixably joined to the first launch rail 120 and includes a plurality of tightening bolts 192 that may be tightened to forcibly secure the second launch rail 160 within the clamp 190 to join the first launch rail 120 to the second launch rail 160. In a particular embodiment, the clamp 190 also may include a plurality of dowels and/or springs to guide the clamps and rails to the proper position and facilitate rapid assembly and disassembly of the rail assembly. The clamp 190 and the tightening bolts 192 engage exterior surfaces 122 and 162 of the launch rails 120 and 160, respectively. As further described below with reference to FIG. 3, the carriage assembly 200 engages an internal track within the rail assembly 100, and a portion of the carriage assembly 200 extends through a slot 150 in an upper face of the rail assembly 110. Thus, the clamp 190 and the tightening bolts 192 engage only the external surfaces 122 and 162 of the launch rails 120 and 160, respectively, so as not to impinge upon the internal track.

An advantage of the embodiment of the UAS launcher 100 of FIG. 1 is that the carriage assembly 200 engages an internal track of the rail assembly 110, rather than engaging an external surface of a rail assembly. Specifically, the internal track is somewhat protected from damage or accumulation of foreign matter because the track is enclosed by outer surfaces. This may be particularly significant in a man-portable device that may be handled roughly as it is transported. As a result, damage to or debris deposited on external surfaces of the rail assembly 110 may not interfere with translation of the carriage assembly 200 along the internal track of the rail assembly 110.

The first launch rail 120 supports a plurality of assemblies. In a particular embodiment, one or more of the assemblies may be fixably coupled to the first launch rail 120 to simplify subsequent assembly of the UAS launcher 110. In the embodiment of FIG. 1, in addition to the clamp 190, the first launch rail 120 includes an anchor assembly 124, a UAS support assembly 130, and the launch control system 700.

The anchor assembly 124 is removably attachable to the first launch rail 120 adjacent the first end 102 of the rail assembly. The anchor assembly 124 is slidably received within an end of the first launch rail 120 adjacent the first end 102 of the rail assembly. The anchor assembly 124 is securable to the first launch rail 120 with a fastening screw 126. The anchor assembly 124 includes an anchor opening 128 configured to receive and engage an anchor pin (not shown in FIG. 1) configured to secure the anchor assembly 124 to a surface adjacent the first end 102 of the rail assembly. The anchor pin may include a pin configured to secure a mount within the surface upon which the UAS launcher 110 is mounted. Alternatively, the anchor pin may be in the form of a stake configured to be driven into the ground. The anchor assembly 124 and the anchor pin thus secure the rail assembly 110 to the ground to prevent the rail assembly 110 from being tipped over by crosswinds, accidental bumping, or reaction forces resulting from launching a UAS from the UAS launcher 100. As further described below with reference to FIG. 5, the anchor assembly 124 may removable so as to be replaced with a wind vane for use in an alternative mounting system. Alternatively, as further described with reference to FIG. 5, the wind vane may be attachable to the anchor assembly 124 without first removing the anchor assembly 124.

The UAS support assembly 130 is one of removably and fixably coupled to the first launch rail 120. In a particular embodiment, the UAS support assembly supports undersides of wings of a UAS to stabilize the UAS atop the carriage assembly 200 prior to launch. The UAS support assembly 130 includes a cross member 132 that is coupled to an underside of the first launch rail 120, so as not to interfere with translation of the portion of the carriage assembly 200 extending through the slot 150 on an upper side of the rail assembly 110. In a particular embodiment, the cross member 132 is rotatable to accommodate multiple types and versions of UAS. Upright support members 134 extend from opposite ends of the cross member 132. Upper ends of the upright support members 134 are capped with UAS support bumpers 136. The upright support members 134 may be rigid bodies to provide support for the UAS; the UAS support bumpers 136 are compressible to protect the UAS from damage that may be result from putting the UAS in contact the rigid upright support members 134. In a particular embodiment, the height of the upright support members 134 may be adjustable to accommodate multiple types and versions of UAS.

The launch control system 700 is coupled to the first launch rail 120. The launch control system 700 includes a control module 710 and a carriage release mechanism 720. The control module 710 may be coupled to an underside of the first launch rail 120 so as not to interfere with translation of the carriage assembly 200 along the upper side of the rail assembly 110. The control module 710 is operably coupled to a carriage release mechanism 720 at an end of the slot 150 adjacent the first end of the rail assembly 110 on an upper side of the rail assembly 110. The carriage release mechanism 720 includes a trigger lever 722 that is configured to engage a socket in the carriage assembly 200 to hold the carriage assembly 200 in a launch-ready position until the UAS is released for launch. Upon launch of the UAS, the trigger lever 722 is released and thus disengaged from the carriage assembly 200, permitting the carriage assembly 200 to translate toward the launch position at the second end 106 of the rail assembly 110. As further described with reference to FIG. 7, the control module 710 is operably coupled to at least one of a mechanical control device, a wired electrical control device, and a wireless electrical control device from which the control module 710 may receive a release signal to initiate launch of the UAS. Upon receipt of the release signal, the control module 710 engages the carriage release mechanism 720 to disengage the trigger lever 722 from the carriage assembly 200.

To lessen the risk of a launch being triggered accidentally, the UAS launcher 100 may include one or more safety mechanisms to prevent the carriage assembly 200 from being unintentionally released. Accidental release of the carriage assembly 200 before all pre-launch conditions have been satisfied may result in damage, injury, or mission failure. For example, if the carriage assembly 200 were released before an engine on a UAS is activated, the UAS may crash, resulting in loss of or damage to the UAS. Similarly, if the carriage assembly 200 is accidentally released while a person is still preparing the UAS for launch, the UAS may collide with that person. That person may be seriously injured, to say nothing of what damage the UAS may incur from the collision. Further, if the UAS is simply just launched ahead of schedule, mission objectives for the UAS may be missed. These are just a few examples of the many types of harm that may result from inadvertent launch of a UAS. Thus, it may be desirable to include safety mechanisms to prevent such an unintended launch.

One such safety mechanism may include a launch rail safety pin 199. The launch rail safety pin 199 is configured to be received into a launch rail socket 198 in the first launch rail 120. In a particular embodiment, the launch rail safety pin 199 is inserted into the launch rail socket 198 once the carriage assembly 200 is secured in a launch-ready position, as further described with reference to FIGS. 4A-4D. The launch rail socket 198 and the launch rail safety pin 199 are configured so that a portion of the launch rail safety pin 199 extends at least partially across an internal track 310 (FIG. 3) of the rail assembly 110. The launch rail safety pin 199 may be received in a path directly ahead of a launch-facing surface 211 (FIG. 2) of a base 210 of carriage assembly 200 as the carriage assembly 200 rests in the launch-ready position. Thus, if the carriage assembly 200 should be released prematurely, the launch rail safety pin 199 may impinge upon the launch-facing surface 211 of the base 210 of carriage assembly 200. As a result, the launch rail safety pin 199 may block the carriage assembly 200 from proceeding to the launch position, thereby potentially preventing injury, damage, or missed mission objectives.

Alternatively, the launch rail socket 198 and the launch rail safety pin 199 may be configured to cause the launch rail safety pin 199 to engage some other portions of the rail assembly 110 and the carriage assembly 200. For example, the launch rail safety pin 199 may be configured to engage the carriage assembly 200 at some portion of a cradle 250 (FIG. 2) or one of the brackets 260 or 270 (FIG. 2) supporting the cradle 250. Correspondingly, the launch rail socket 198 may be formed in some other portion of the rail assembly 110 to receive the launch rail safety pin 199 at a location adjacent to where the launch rail safety pin 199 is to be received so as to engage the selected portion of the carriage assembly 210.

In a particular embodiment, the launch rail safety pin 199 may include a quick release-type pin, such as a spring ball pin with a push-button release. Such a pin may be inserted into the launch rail socket 198, where the launch rail safety pin 199 and the launch rail socket 198 are sized or otherwise configured so that the launch rail safety pin 199 is secured within the launch rail socket 198 until the launch rail safety pin 199 is deliberately released and removed from the launch rail assembly 110.

Other types of safety mechanisms may be used in addition to or instead of the launch rail safety pin 199. For example, a trigger release safety pin, as described with reference to FIG. 7, may be used to prevent the trigger release from being moved so as to release the carriage assembly.

Once the one or more safety mechanisms have been removed, the carriage assembly 200 is permitted to travel within the slot 150 defined by the rail assembly 110. The slot 150 includes a first stop 152 at an end of the slot 150 adjacent the first end 102 of the rail assembly 110 and a second stop 154 at an end of the slot 150 adjacent the second end 106 of the rail assembly 110. The first stop 152 and the second stop 154 restrict movement of the carriage assembly 200 within the slot 150 between the launch-ready position adjacent the first end 102 of the rail assembly 110 and the launch position adjacent the second end 106 of the rail assembly 110. A first shock absorber 156 may be disposed adjacent to the first stop 152 and a second shock absorber 158 may be disposed adjacent to the second stop 154 to decelerate the carriage assembly 200 as the carriage assembly 200 reaches the launch-ready position and the launch position, respectively.

A second launch rail 160 may support at least one other additional assembly, a vertical support assembly 170, coupled to the second launch rail 160 adjacent the second end 106 of the rail assembly. The vertical support assembly 170 allows for the rail assembly 110 to be angled upward adjacent the second end 106 of the rail assembly 110 to propel a UAS at an upward angle upon launch. The vertical support assembly 170 is configured to support the second end 106 of the rail assembly 110 at a height above a surface. In the embodiment of FIG. 1, the vertical support assembly 170 includes one or more struts 172 and 174 configured to engage the external surface 162 of the second launch rail 160. The one or more struts 172 and 174 may be rotatably mounted to the external surface 162 of the second launch rail 160, enabling the one more struts 172 and 174 to be rotated between a stowed position parallel with a length of the second launch rail 160 and a deployed position at an angle to the second launch rail 160. The one or more struts 172 and 174 of the vertical support assembly 170 may be configured to be adjusted in length to enable adjustment of the height at which the vertical support assembly 170 supports the second end 106 of the rail assembly 110 above the surface.

The second launch rail 160 also may support a hitch 180 configured to engage a second end of the one or more elastic members further described with reference to FIGS. 4A and 4B. The carriage assembly 200 supports a companion hitch 280 configured to engage a first end of the one or more elastic members. When the one or more elastic members are secured between the hitches 180 and 280 and the carriage assembly 200 is secured by the trigger lever 722 of the launch control system 700, the one or more elastic members are extended to a strained position. Subsequent release of the trigger lever 722 enables the one or more elastic members to contract to a relaxed position. The contracting of the one or more elastic members motivates the carriage assembly 200 to move toward the launch position adjacent the second end 106 of the rail assembly, propelling the UAS from the UAS launcher 100.

In a particular embodiment, it may be desirable for the UAS launcher 100 to be man-portable to enable the UAS launcher to be carried by one or more persons to a location that may not be reachable by motorized vehicles. Thus, in a particular embodiment, components of the UAS launcher 100 may be configured to weigh not more than a total of approximately 25 pounds (11.4 kilograms). At such a relatively low weight, components of the UAS launcher 100 may be packed into one or more transport containers, and the contained UAS launcher 100 still may be easily transported without aid of a motorized vehicle.

Figure 2:
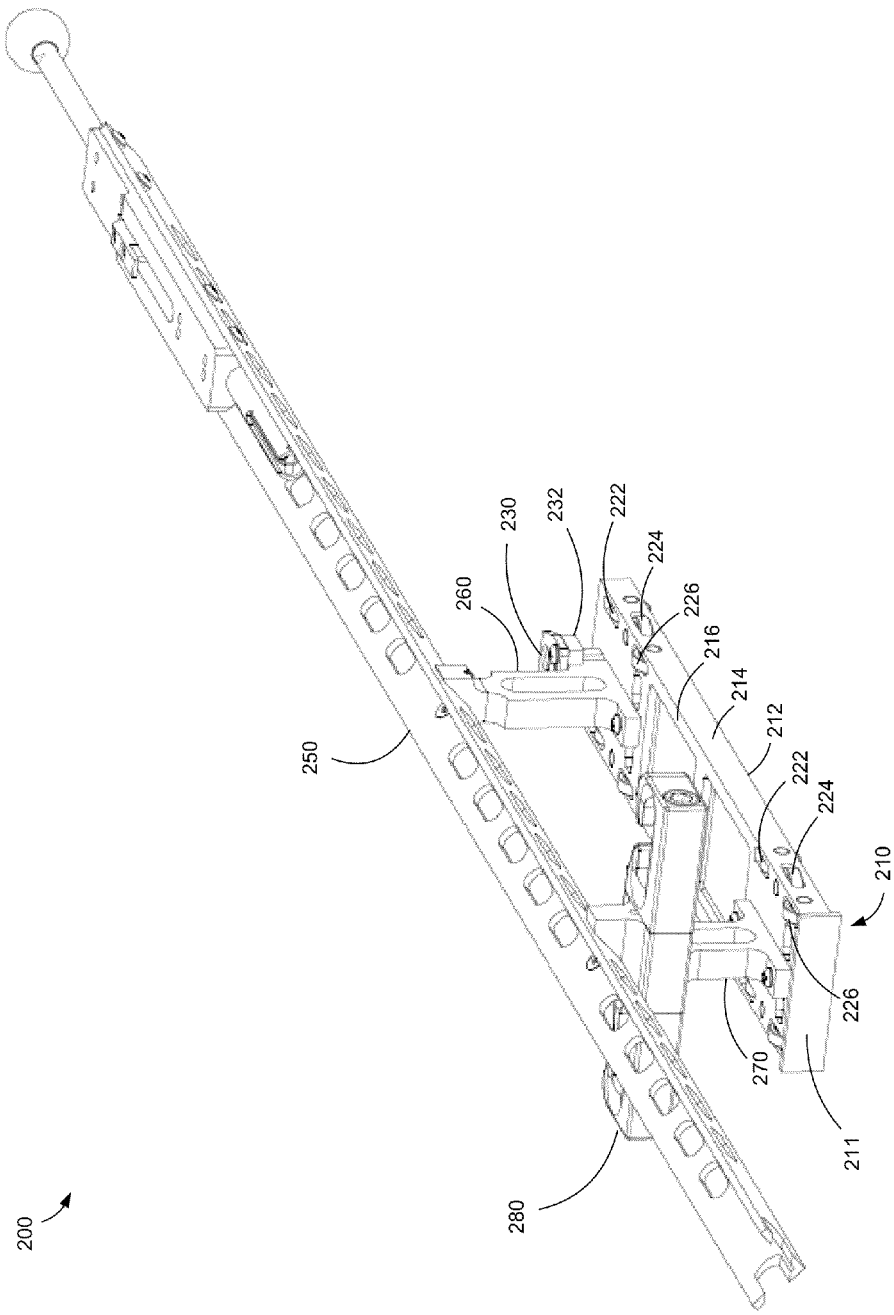
FIG. 2 is a perspective view of the carriage assembly of the UAS launcher of FIG. 1.

FIG. 2 depicts an embodiment of the carriage assembly 200. In the embodiment of FIG. 2, the carriage assembly includes three principle assemblies: a base 210 configured to translate within the internal track of the rail assembly 110, a cradle 250 configured to support a UAS that is to be launched, and one or more brackets 260 and 270 configured to support the cradle 250 above the base 210. As previously described with reference to FIG. 1, base 210 of the carriage assembly 200 travels within the internal track of the rail assembly 110. The brackets 260 and 270 extend through the slot 150 in the rail assembly 110 to support the cradle 250 above the rail assembly 110. As also previously described with reference to FIG. 1, the carriage assembly 200 includes a hitch 280 configured to engage a first end of the one or more elastic members (not shown in FIG. 2). Specifically, the hitch 280 is secured to the bracket 270 which is on an end of the carriage assembly facing the second end 106 of the rail assembly 110, as shown in FIG. 1. In a particular embodiment, the hitch 280 is designed with curved ends and a narrow opening to prevent the first end of one or more elastic members (not shown in FIG. 2) from releasing from the hitch 280 and creating a strike hazard or allowing the carriage assemble to translate back to the launch ready position.

As further described with reference to FIG. 3, the base 210 of the carriage assembly 200 is configured to travel within the internal track of the rail assembly 110. To facilitate translation of the base 210 within the internal track of the rail assembly 110, base 210 includes a plurality of rolling members 222, 224, and 226 configured to engage internal faces of the internal track of the rail assembly 110. The rolling members 222, 224, and 226 are configured to rotatably engage internal sides of the internal track of the rail assembly 110 in orthogonal directions.

Specifically, lower-facing rolling members 222 are configured to extend through a lower surface 212 of the base 210 to engage a first internal face of a bottom side of the internal track. Side-facing rolling members 224 are configured to extend through side surfaces 214 of the base 210 to engage second internal faces of the sides of the internal track. By at least having lower-facing rolling members 222 engage the first internal face of the bottom side of the internal track, the base 210 may translate relative to the internal track with reduced friction between the base 210 and the first internal face of the bottom side of the internal track. Having side-facing rolling members 224 engage second internal faces of the lateral sides of the internal track, the base 210 may translate relative to the internal track with reduced friction between the base 210 and the second internal faces of the internal track. By further including upper-facing rolling members 226 configured to extend through an upper surface 216 of the base 210 to engage a third internal face of the top side of internal track, the base 210 may translate relative to the internal track with reduced friction between the base 210 and any of the internal faces of the sides of the internal track.

As described with reference to FIG. 1, the carriage assembly 200 also includes a socket 230 configured to be engaged by the trigger lever 722 of the launch control system 700. The trigger lever 722 engaging the socket 230 holds the carriage assembly 200 in place. In a particular embodiment, the trigger lever 722 secures the carriage assembly 200 in the launch-ready position so that the elastic members may be attached to the launcher after the carriage assembly has been locked in place, thereby allowing the carriage assembly 200 to be placed in the launch position before pressure is exerted by the one or more elastic members on the hitch 280. As shown in the embodiment of FIG. 2, the socket 230 may be supported by a socket mount 232 that supports the socket 230 from one or both of the base 210 and one of the brackets 260.

Figure 3:
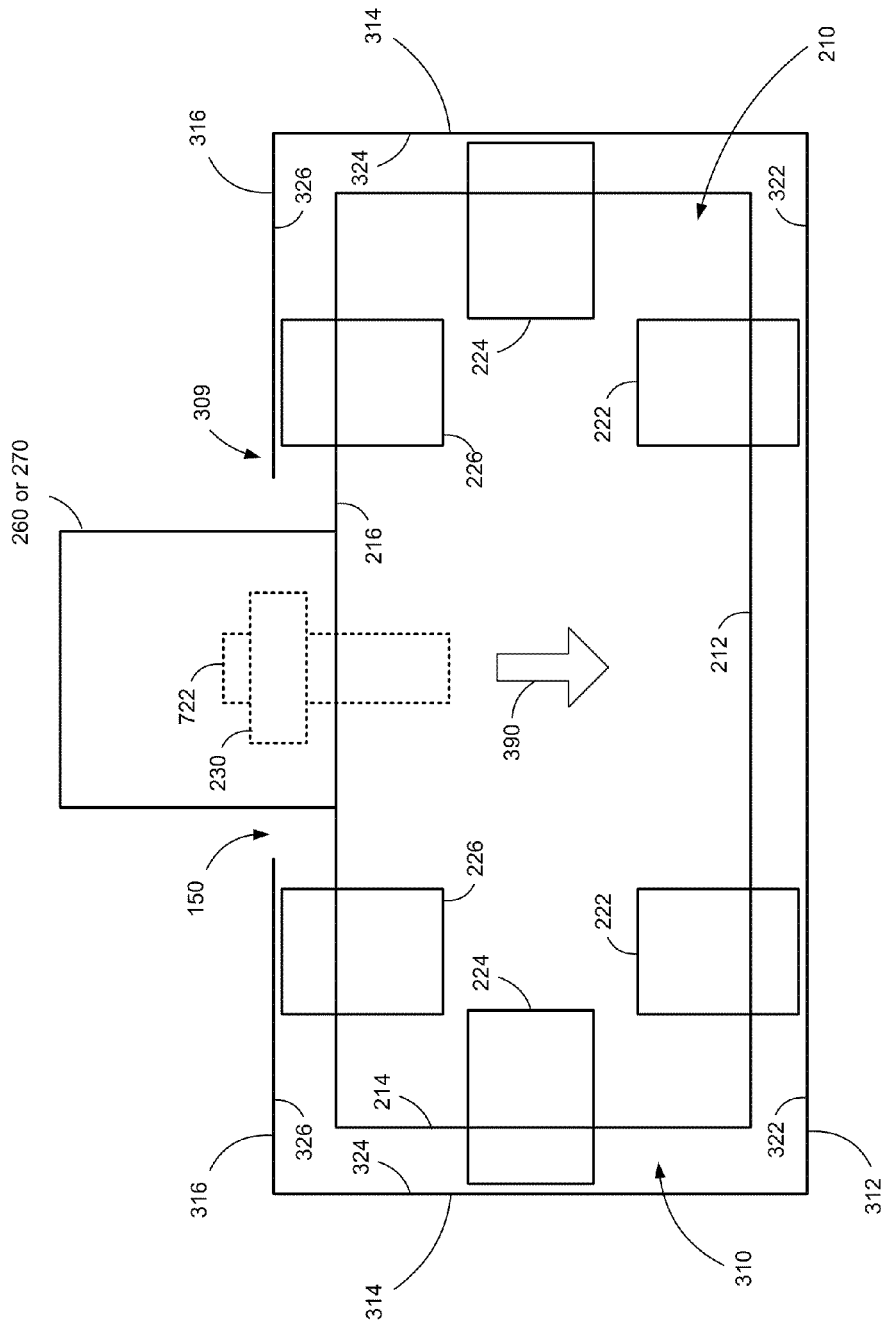
FIG. 3 is a cross-sectional view of a base of the carriage assembly engaging an internal track of the rail assembly and a trigger lever configured to release the carriage assembly for launch.

FIG. 3 is a cross-sectional view of the base 210 of the carriage assembly 200 engaging an internal track 310 of the rail assembly 110 and the trigger lever 722. In a particular embodiment, the launch rails 120 and 160 (not specifically shown in FIG. 3) may be formed by an extruded material 309 formed to provide members having the desired cross-section to define the internal track 310. The material may include, for example, aluminum, so as to provide structural rigidity and light weight to facilitate portability of the members. Aluminum also is known to be suitable for forming members via extrusion. However, other metals and other materials also may be used to form the members that define the internal track 310. In addition, instead of forming the members via extrusion, separate sides of the internal track 310 may be created and joined via welding or another attachment process to join the sides to define the internal track 310.

As described with reference to FIG. 2, the lower-facing rolling members 222 extending through the lower surface 212 of the base 210 are configured to engage a first internal face 322 of a bottom side 312 of the internal track 310 of the rail assembly 110. The side-facing rolling members 224 extending through the side surfaces 214 of the base 210 are configured to engage second internal faces 324 of lateral sides 314 of the internal track 310 of the rail assembly 110. The upper-facing rolling members 226 extending through the upper surface 216 of the base 210 are configured to engage a third internal face 326 of the top side 316 of the internal track 310 of the rail assembly 110.

The base 210 of the carriage assembly 200 is encompassed within the internal track 310 of the rail assembly, with the brackets 260 and 270 extending from the base 210 through the slot 150 defined by the top side 316 of the rail assembly 110. In a particular embodiment of the UAS launcher, the base 210 is received within the internal track 310 of the rail assembly 110 before the first launch rail 120 and the second launch rail 160 are joined by the clamp 190. The base 210 may be inserted into either or both of the launch rails 120 and 160 with the brackets 260 and 270 being fitted through the slot 150. Once the carriage assembly 210 is in place, the launch rails 120 and 160 may be secured to one another using the clamp 190, as described with reference to FIG. 1.

When the carriage assembly 200 is moved into a launch-ready position, the trigger lever 722 may be used to secure the carriage assembly 200 in place. The trigger lever 722 engages the socket 230 that is mounted on the base 210 and/or one of the brackets 260 or 270 of the carriage assembly 200, as previously described with reference to FIG. 2. When a UAS mounted on the carriage assembly is to be launched, the launch control system 700 (not shown in FIG. 3) causes the trigger lever 722 to be withdrawn from the socket 230. In one embodiment, the trigger lever 722 may be withdrawn from the socket 230 as a result of the carriage release mechanism 720 causing the trigger lever 722 to translate in a direction 390, releasing the carriage assembly 200. In another embodiment, instead of the trigger lever 722 being translated in a downward direction 390 as shown in FIG. 3, the trigger lever 722 may be rotatably mounted within the carriage release mechanism 720, so that the trigger lever 722 rotates downward and away from the socket 230 and to disengage from the socket 230, as described below with reference to FIG. 7.

FIGS. 4A, 4B, 4C, and 4D are top views of the carriage assembly 200 being motivated to translate along the rail assembly 110 into a launch-ready position 402 and then released to enable the carriage assembly 200 to be propelled to a launch position 403. For purposes of illustrating translation of the carriage assembly 200, some elements of the rail assembly 110, including the anchor assembly 124, the UAS support assembly 130, and some other components have been omitted from FIGS. 4A-4D for the sake of visual simplicity. As previously described, in a particular embodiment, the carriage assembly 200 is moved from a non-launch-ready position into a launch ready position, as shown in FIGS. 4A-4B. FIG. 4C shows the one or more elastic members 410 coupled between the carriage assembly 200 and the rail assembly 110 to provide motive force to propel the carriage assembly 200 to launch a UAS as previously described. The one or more elastic members 410 are represented by segmented lines to visually depict the strain imparted to the one or more elastic members 410 as a result of the different relative positions of the carriage assembly 200 and the rail assembly 110, as further described below. FIG. 4D shows the UAS launcher in the launch position after the UAS has been launched.

FIG. 4A shows the carriage assembly 200 at an exemplary initial position 401 at a midpoint along a length of the slot 150. In a particular embodiment, before the carriage assembly 200 is moved to a launch-ready position 402 (FIG. 4B), no elastic members are attached to the rail assembly 110 or to the carriage assembly 200. With no elastic members attached to the rail assembly 110 and/or to the carriage assembly 200 the carriage assembly 200 may be translated to the launch-ready position 402 without overcoming strain that may be generated by the elastic members. In a particular embodiment, the rail assembly 110 includes the launch rail socket 198 configured to receive a launch rail safety pin (not shown in FIG. 4A) to prevent inadvertent launch of a UAS as described with reference to FIG. 1. Because the carriage assembly 200 is not secured in a launch-ready position, the launch rail safety pin 199 is not installed to prevent accidental launch of a UAS.

FIG. 4B shows the carriage assembly 200 translated to the launch-ready position 402. Although it is not shown in FIG. 4B, when the carriage assembly 200 reaches the launch-ready position 402, the carriage assembly 200 may be secured in place by the trigger lever 722 of the launch control system 700 engaging the socket 230 mounted on the carriage assembly 200, as previously described with reference to FIG. 3. With the carriage assembly 200 secured in the launch-ready position, but before the one or more elastic members 210 (FIGS. 4C-E) are coupled to the rail assembly 110 and to the carriage assembly 200, one or more safety mechanisms may be used to secure the UAS launcher 100 against inadvertent launch. For example, the launch rail safety pin 199 may be received into the launch rail safety socket 198, as previously described with reference to FIG. 1. Additionally, or instead of using the launch rail safety pin 199, as previously described, a carriage release safety mechanism as described below with reference to FIG. 7 (not shown in FIGS. 4A-4D) may be used to prevent unintended launch of a UAS.

FIG. 4C shows elastic members 410 being coupled to the rail assembly 110 and to the carriage assembly 200 in order to prepare for launch of a UAS. At a first end 412 of the one or more elastic members 410, the one or more elastic members 410 are coupled to the hitch 280 mounted on the carriage assembly 200. At a second and 414 of the one or more elastic members 410, the one or more elastic members 410 are coupled to the hitch 180 affixed to the rail assembly 110 adjacent the second and 106 of the rail assembly 110. As shown in FIG. 4C, the launch rail safety pin 199 may remain in place in the launch rail socket 198 to prevent accidental launch of a UAS with strain applied by the one or more elastic members 410 to the UAS launcher 100.

In a particular embodiment, with the carriage assembly 200 moved to the launch-ready position 402, the one or more elastic members 410 are coupled between the hitches 180 and 280 one at a time. It will be appreciated that attaching each of the one or more elastic members 410 between the hitches 180 and 280 one at a time requires appreciably less force than attaching multiple elastic members between the hitches 180 and 280 before the carriage assembly 200 is secured in the launch-ready position 402. The segmented lines representing the one or more elongated members in FIG. 4C include a plurality of long dashes. The long dashes are used to visually depict the one or more elastic members 410 extended to a strained position in preparation for launch. The strain of the one or more elongated elastic members 410 is used to propel the carriage assembly 200 along the rail assembly 110 toward the second end 106 of the rail assembly to launch a UAS. To enable the carriage assembly 200 to propel the UAS along the rail assembly 110 before launch—the launch rail safety pin 199 (and any other safety mechanism to prevent inadvertent launch) is removed from the rail assembly 110 (as previously described) or from the trigger assembly (as further described below).

FIG. 4D shows the carriage assembly 200 as propelled to a launch position 403 toward the second and 106 of the rail assembly 110. Upon release of the trigger lever 722 (not shown him FIG. 4D), the stain in the one or more elastic members 410 propels the carriage assembly 200 to a launch position 403 toward the second end 106 of the rail assembly. A force 423 (represented by an arrow 423 facing the second end 106 of the rail assembly 110) caused by the strain in the one or more elastic members 410 causes the carriage assembly 200 to accelerate as it moves along the slot 150 toward the launch position 403 adjacent the second end 106 of the rail assembly 110. Acceleration of the carriage assembly 200 accelerates a UAS (not shown in FIG. 4D) received on the carriage assembly 200 to launch the UAS. The contracting of the one or more elastic members 410 to a relaxed position is depicted by a curled, dotted line in FIG. 4D.

In a particular embodiment, the hitches 180 and 280 are curved at the ends to create a narrow opening (not shown) in which the one or more elastic members 410 are secured. The inclusion of the narrow openings hold the one or more elastic members 410 in place after the carriage assembly 200 has been released to travel to the launch position 403. Securing the one or more elastic members 410 in place during and after launch may prevent the elastic members from releasing from hitches 180 and 280 while the carriage assembly is translated to the launch position and then decelerated and thus causing a strike hazard. Maintaining the one or more elastic members 410 in place also may maintain some strain on the carriage assembly 200 after the UAS has been launched to prevent the carriage assembly 200 from bouncing back and forth between the launch-ready position 402 and the launch position 403 after the UAS has been launched, thereby avoiding possible wear, impact damage, or injury to the rail assembly 110, the carriage assembly 200, or nearby persons or property that may result if the carriage assembly 200 were permitted to bounce back and forth along the rail assembly after launch 110.

In sum, according to embodiments of the UAS launcher 100 shown in FIGS. 1-4C, the UAS launcher 100 is placed on a surface where the rail assembly 110 is anchored to a surface via the anchor assembly 124, which is adjacent a first end 102 of the rail assembly 110. The rail assembly 110 is supported above a surface by the vertical support assembly 170 adjacent the second end 106 of the rail assembly 110. After the carriage assembly 200 is translated into the launch-ready position 402 without strain, the one or more elastic members 410 are coupled to create a strain that results in a force 423 being applied to the carriage assembly 200. When the carriage assembly 200 is released for launch by the launch control system 700, the force 423 applied by the one or more elastic members 410 propels the carriage assembly 200 toward the launch position 403. As a result, a UAS received on the carriage assembly 200 is launched in a direction of the second end 106 of the rail assembly 110.

Persons of ordinary skill in the art may appreciate that it may be desirable to launch a UAS in an upwind direction so that the movement of air caused by passage of a prevailing wind over lift surfaces of the UAS generates additional lift that may be added to lift generated by acceleration of the UAS provided by the UAS launcher 100. As a result, it may be desirable to install the UAS launcher 100 with the second end 106 of the UAS launcher directed into the prevailing wind and with the anchor assembly 124 at the first end 102 of the rail assembly being anchored in a downwind direction of the prevailing wind.

However, a direction of the prevailing wind may change appreciably. For example, weather conditions may cause wind direction to suddenly and repeatedly shift. Further, if the UAS launcher is set up significantly in advance of a launch because an anticipated launch is delayed or because there is a logistical reason to set up the UAS launcher well in advance of the launch, wind direction may change significantly between setup and launch. Changes in the wind direction may interfere with the possibility of a successful launch. For example, a cross wind may cause the UAS to crash, terminating the instant mission of the UAS and potentially resulting in significant damage to or complete loss of the UAS.

Depending on site-specific conditions or other circumstances, it may be burdensome or impossible to reposition the UAS launcher to face upwind prior to launch. For example, personnel may not be available to reposition the UAS launcher prior to a desired launch, or available personnel may not be able to reach the UAS launcher site because of presence of hostile personnel near the site. Thus, it may be desirable to provide a mechanism to enable the UAS launcher to automatically reposition itself to be able to direct the UAS launcher to face upwind into a currently prevailing wind.

Figure 5:
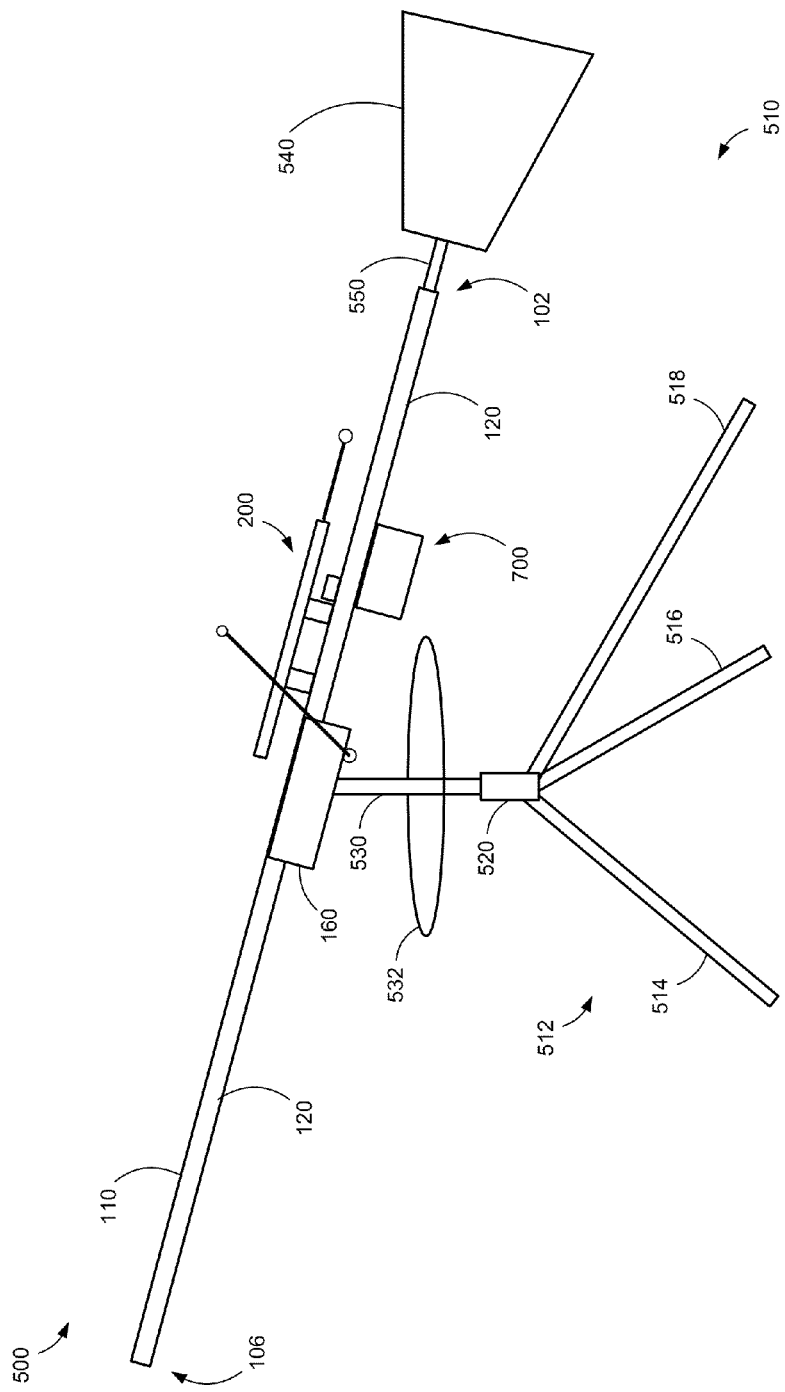
FIG. 5 is a perspective view of a UAS launcher using an alternative mount assembly that employs a rotatable mount and wind vaning to automatically reposition the UAS launcher to launch a UAS upwind into a currently prevailing wind.

FIG. 5 is a perspective view of a UAS launcher 500 using an alternative mount assembly 510 that employs wind vaning to automatically reposition the UAS launcher to launch a UAS upwind into a currently prevailing wind. The alternative mount assembly 510 includes a base assembly 512 and a wind vane 540 that are used to enable wind vaning to automatically reorient the UAS launcher 500. The alternative mount assembly 510 enables the rail assembly 110, the carriage assembly 200, and other components mounted on or secured to the rail assembly 110 to rotate freely above a surface supporting the alternative mount assembly 510. The wind vane 540 engages the prevailing wind, resulting in a reaction force that causes the first end 102 of the rail assembly 110 to face downwind, thereby causing the second end 106 of the rail assembly 110 from which a UAS is launched to face upwind into the prevailing wind.

The UAS launcher 500 includes a rail assembly 110 like that previously described with reference to FIGS. 1-4C, the description of which is incorporated herein by reference. As depicted in FIG. 5, the rail assembly 110 does not include all of the elements of the rail assembly 110, such as the vertical support assembly 170 shown in FIG. 1. However, the vertical support assembly 170 may remain coupled to the rail assembly 110 of the UAS launcher 500 of FIG. 5. The vertical support assembly 170 may extend from the second end 106 of the rail assembly 110 but not engage the surface beneath the UAS launcher 500 because the vertical support assembly 170 and the rest of the rail assembly 110 is supported above the surface by the alternative mount assembly 510. Further, as described with reference to FIG. 1, the vertical support assembly 170 may be rotatably secured to the rail assembly 110 to enable the vertical support assembly 170 to be rotated into a stowed position when not in use.

In the embodiment of FIG. 5, the base assembly 512 includes a tripod comprised of legs 514, 516, and 518. The base assembly 512 supports a coupling 520 configured to rotatably engage a rotatable post 530 configured to be secured to the rail assembly 110. In a particular embodiment, the rotatable post 530 desirably may be coupled near a mid-point of the rail assembly to enable somewhat even distribution of mass of the rail assembly 110 and a UAS (not shown). Somewhat even distribution of mass at the rotatable post 530 may help to reduce torque between the rotatable post 530 and the coupling 520 that may cause friction between the rotatable post 530 and the coupling 520. Friction between the rotatable post and the coupling may impede free rotation of the rotatable post 530 within the coupling 520. In a particular embodiment, for example, the rotatable post 530 may be fixably or removably coupled to an underside of the clamp 190 that is used to secure launch rails of the rail assembly 110 to one another, as described with reference to FIG. 1.

In addition, the rotatable post 530 may support a palette 532 that rotates with the rotatable post 530. Thus, if there are any accessories of the launch control system 700 or other components that it may be desired to have rotate along with the rest of the rail assembly, those accessories or components may be mounted on the palette 532. For example, if components such as an external signal receiver or a battery pack (not shown in FIG. 5) were to be used with the launch control system 700 and coupled to the launch control system via one or more cables, placing those components on the palette 532 would enable the components to rotate with the launch control system 700 and the rest of the rail assembly 110 without the one or more cables become fouled, twisted, or damaged as the rail assembly 110 rotates relative to the base assembly 512.

As previously described, the wind vane 540 is coupled to the rail assembly 110 via the anchor assembly 124 or in place of the anchor assembly 124. The wind vane 540 is configured to engage the prevailing wind. The wind vane 540 thereby causes the entire rail assembly 110 to rotate to enable the second end 106 of the rail assembly 110 to automatically face upwind into the prevailing wind.

In a particular embodiment, a mounting post 550 of the wind vane 540 is received into slots or tracks (not shown) of the anchor assembly 124. Alternatively, the anchor assembly 124 may be removed from the first launch rail 120 and be may be replaced by the wind vane 540. In this second embodiment, just as the anchor assembly 124 was secured in place with the fastening screw 126, a mounting post 550 of the wind vane 540 may be removably secured to the first launch rail 120 with the fastening screw 126 (FIG. 1; not shown in FIG. 5).

In a particular embodiment, it may be desirable for the UAS launcher 500 including the alternative mount assembly 510 to be man-portable to enable the UAS launcher to be carried by one or more persons to a location that may not be reachable by motorized vehicles. Thus, in a particular embodiment, components of the UAS launcher 500 may be configured to weigh not more than a total of approximately 50 pounds (22.7 kilograms). As previously described with reference to the UAS launcher 100 of FIG. 1, components of the UAS launcher 500 exclusive of the alternative mount assembly 510 may be configured to weigh not more than a total of approximately 25 pounds (11.4 kilograms). Thus, an embodiment of the alternative mount assembly 510 may be configured to weigh not more than 25 pounds (11.4 kilograms).

Figure 6:
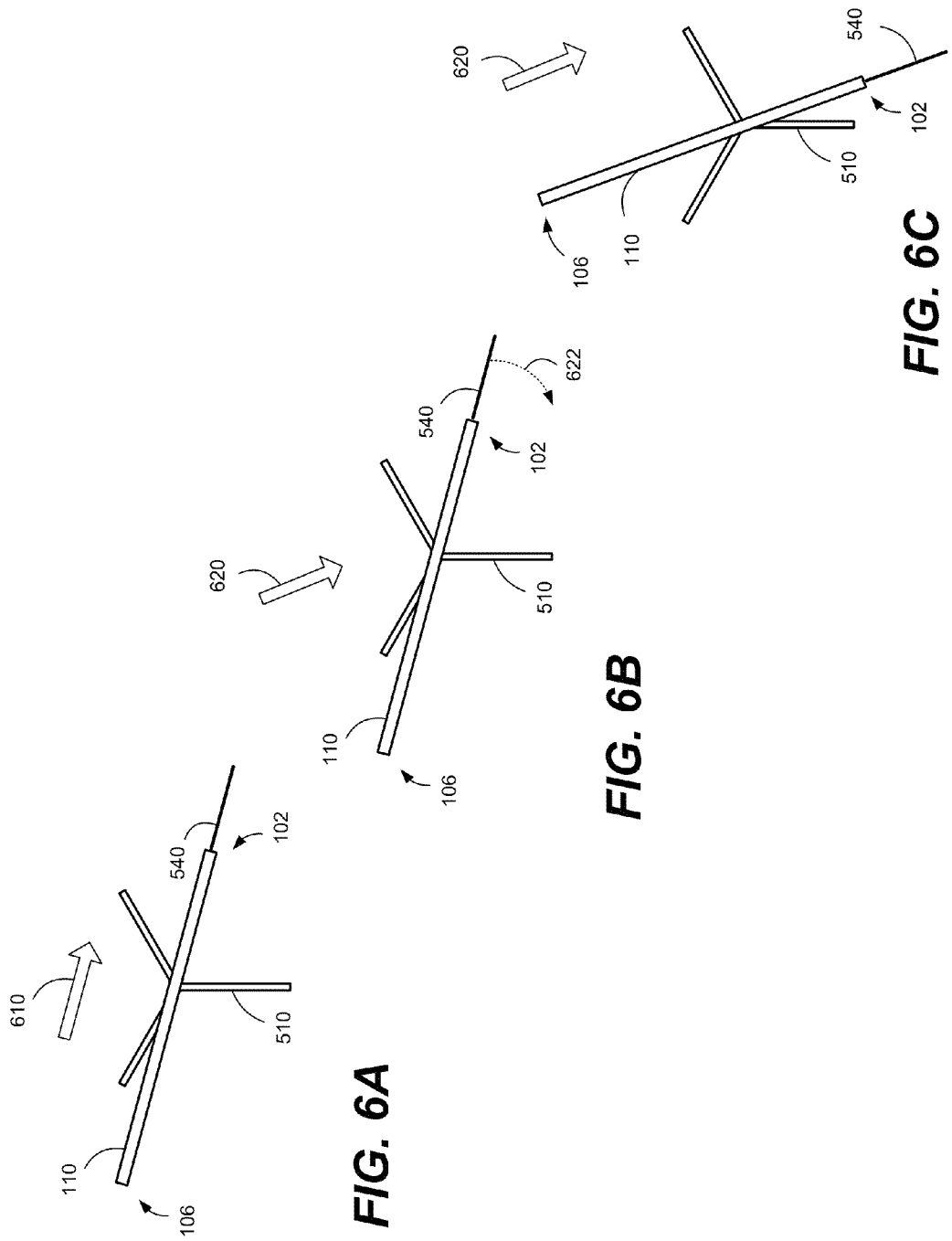
FIGS. 6A-6C are top views of the embodiment of the UAS launcher of FIG. 5 in which a rotatably mounted rail assembly automatically rotates in response to a change in direction of a prevailing wind.

FIGS. 6A-6C are top views of the UAS launcher 500 of FIG. 5 in which the rail assembly 110 automatically rotates relative to the alternative mount assembly 510 in response to change in a prevailing wind. In each of FIGS. 6A, 6B, and 6C, a direction of the prevailing wind is indicated by arrows 610 and 620.

FIG. 6A shows the rail assembly 110 rotated upon the alternative mount assembly 510 so that the second end 106 of the rail assembly 110 faces upwind into the direction of the prevailing wind 610. The prevailing wind 610 engages the wind vane 540, exerting a force on the wind vane 540 that causes the wind vane 540 to face downwind consonant with the direction of the prevailing wind 610. The movement of the wind vane 540 causes the first end 102 of the rail assembly 110 to face downwind. As a result, the second, opposite end 106 of the rail assembly 110 is turned upwind into the direction of the prevailing wind 610.

FIG. 6B shows the rail assembly 110 with the second end 106 facing upwind into the direction of the previously prevailing wind 610 (FIG. 6A) when a direction of the prevailing wind 620 changes. Force upon the wind vane 540 caused by the prevailing wind impinging upon the wind vane results in a torque 622 being exerted on the rail assembly 110 relative to the alternative mount assembly 510. As shown in FIG. 6C, the torque 622 caused by the prevailing wind causes the rail assembly 110 to rotate relative to the alternative mount assembly 510. The rail assembly 110 rotates relative to the alternative mount assembly 510 until the wind vane 540 at the first end 102 of the rail assembly 110 faces downwind consonant with the direction of the prevailing wind 620. As a result, the second end 106 of the rail assembly 110 now faces upwind into the direction of the prevailing wind 620. Thus, the rail assembly 110 mounted atop the alternative mount assembly 510 is configured to automatically direct the second end 106 of the rail assembly 110 to face upwind. Automatically enabling the second end 106 of the rail assembly 110 to rotate to continually face upwind may provide additional lift for launching the UAS while also reducing the risk of damage to the UAS that may be caused by crosswinds.

Embodiments of a UAS launcher may be man-portable, may automatically adjust for changes in the direction of the prevailing wind, and also provide for launching a UAS in response to a mechanical signal or an electrical signal received either from wired or wireless connection that provide for remote control of a UAS launch. An embodiment of the UAS launcher that provides for multiple modes of initiating launch of a UAS enables a UAS to be launched from on-site when conditions permit, for example, when there is no danger or threat of danger to personnel on-site at as a result of proximity of presence of hostile forces. Alternatively, if it is desirable not to station personnel on-site at a time of launch, as a matter of safety, logistics, or other reasons, a UAS launcher supporting multiple launch modes enables the UAS to be launched from a remote distance. For example, the UAS may be launched remotely from a computer via a computer network via a wired connection or a wireless connection. A UAS launcher supporting multiple modes of initiating launch thus provides for wide flexibility in launching a UAS under a range of circumstances.

Figure 7:
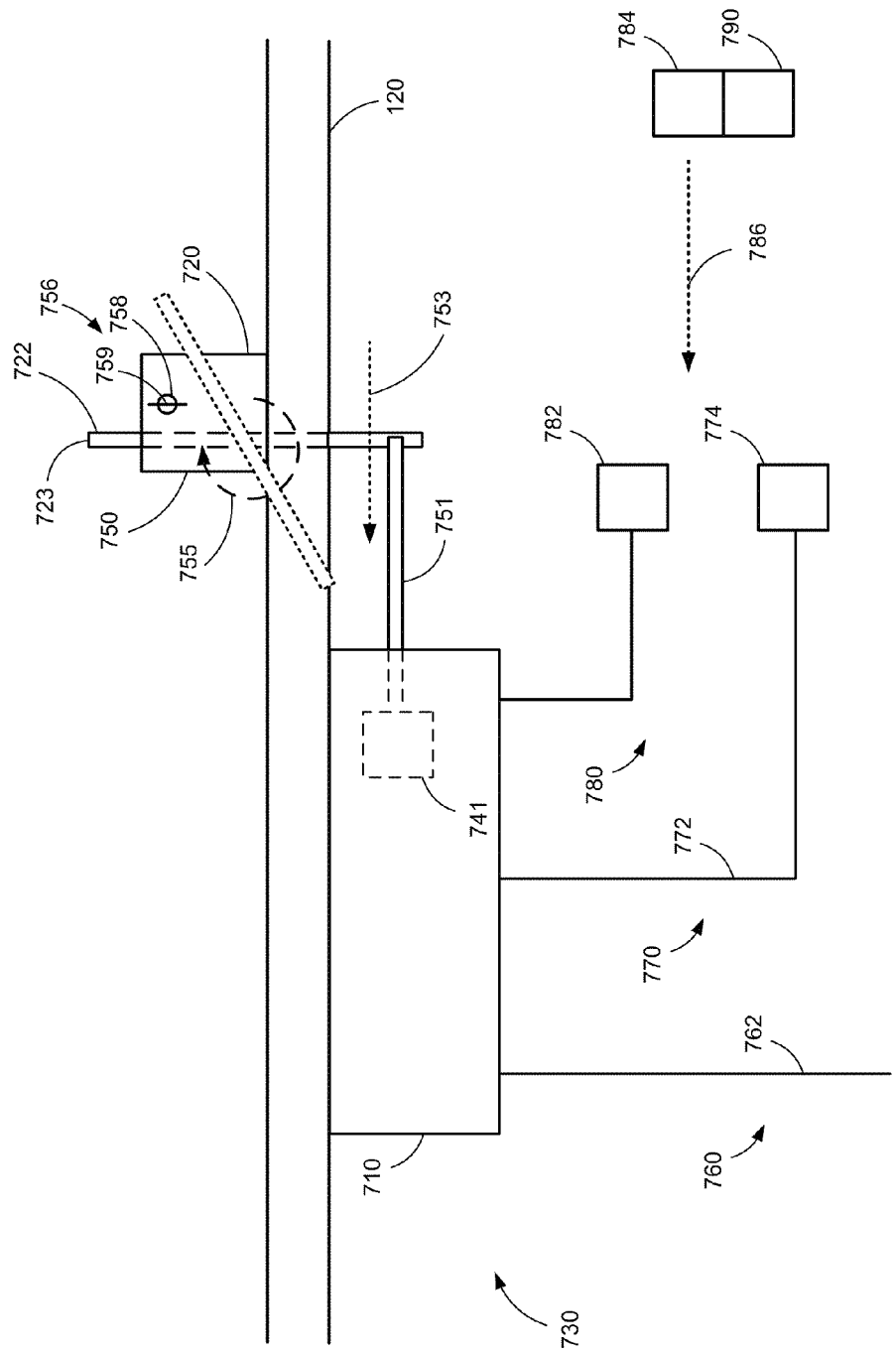
FIG. 7 is a block diagram of a multi-mode launch control system mounted to a first end of the rail assembly of FIG. 1 that may be used to initiate launch of a UAS via a mechanical input, a wired electrical input, and a wireless electrical input.

FIG. 7 is a block diagram of a multi-mode launch control system 730 that may be used to initiate launch of a UAS in response to any of a mechanical launch signal, an electrical launch signal received via a wired connection, and an electrical launch signal received via a wireless connection. The launch control system 700 of FIG. 1, including the control module 710, the carriage release mechanism 720 and the trigger lever 722, may include the multi-mode launch control system 730 of FIG. 7. The control module 710 is configured to direct a carriage release mechanism 720 to release a trigger lever 722 to release the carriage assembly 200 for launch in response to receiving a launch signal as previously described with reference to FIGS. 1-4C.

In a particular embodiment, the control module 710 may incorporate an actuator, such as a solenoid 741. In response to receiving the launch signal, the control module 710 causes the solenoid 741 to be activated to, for example, move a linkage 751 in a direction represented by dotted line 753 to initiate release of the trigger lever 722. In a particular embodiment, the solenoid 741 is rotatably engaged to the trigger lever 722 which, in turn, is rotatably mounted within the carriage release mechanism 720. Thus, when the solenoid 741 is activated, the linkage 751 is drawn in the direction represented by the dotted line 753 to cause the trigger lever 722 to rotate in a direction represented by the dashed line 755. As the trigger lever 722 rotates, an upper end 723 of the trigger lever 722 rotates downward and away from a socket 230 (FIG. 3) in the carriage assembly 200, thereby releasing the carriage assembly 200 for launch. Please note that a degree of movement of the linkage 751 represented by the dotted line 753 and a resulting degree of rotation of the trigger lever 722 represented by the dashed line 755 may be exaggerated to clearly display a mode of release of the trigger lever 722.

As previously described with reference to FIG. 1, the UAS launcher 100 may include one or more safety mechanisms to avoid an unintended release of the carriage assembly 200 to prevent an unintentional launch. In addition to or instead of the launch rail safety pin 199 described with reference to FIG. 1, a carriage release safety mechanism 756 may be used. FIG. 7 depicts an embodiment of the carriage release safety mechanism 756 in which a trigger lever safety pin 759 is configured to be received in a trigger assembly socket 758 in a side of the trigger assembly 720. The trigger lever safety pin 759 is further configured to extend at least partially across a width of the trigger assembly 720 so that, when the trigger lever safety pin 759 is installed in the trigger assembly 720, the trigger level safety pin 759 mechanically blocks rotation of the trigger lever 722. Thus, even if the solenoid 741 were to be triggered, because the rotation of the trigger lever 722 would be blocked by the trigger lever safety pin 759, the trigger lever 722 would remain secured within the socket 230 (FIG. 3) and the carriage assembly 200 would not be released by the activation of the solenoid 741.

The control module 740 of the multi-mode launch control system 730 is configured to receive a launch signal from any of a mechanical input 760, a wired electrical input 770 and a wireless electrical input 780. The mechanical input 760 provides the launch signal to the control module 740 or directly to the trigger lever 722 upon application of a mechanical force. The mechanical force may be applied directly to the trigger lever 722 or a member (not shown) in the control module that is mechanically coupled to the trigger lever 722, or the mechanical force may be applied to a cable or cable release 762. The cable or cable release 762 may engage a member in the control module 740 that is mechanically coupled to the trigger lever 722 or directly coupled to the trigger lever 722 itself.

The multi-mode launch control system 730 also includes a wired electrical input 770 configured to respond to an electrical signal provided by a wired electrical device 774. The wired electrical device 774 may include an electrical switch or an electrical interface that generates an electrical signal that is conveyed by a wired connection 772 to the control unit 740. The wired electrical device 774 may include a foot pedal or a hand switch configured to provide the electrical signal directly to the control unit 740. The electrical interface may include a computer interface, such as a universal serial bus (USB) interface, or a computer network interface, such as an Ethernet interface. Thus, the electrical signal may be provided via the wired electrical input 770 from a local wired electrical device 774, such as an electrical switch or a locally-disposed computer system. Alternatively, the electrical signal may be provided via the wired electrical input 770 from a remotely-situated computer system or other remotely-situated electrical device coupled via a wired network to the wired electrical device 774.

The multi-mode launch control system 730 also includes a wireless electrical input 780 configured to respond to an electrical signal provided to a wireless receiver 782 by a wireless electrical device 784. The wireless electrical device 784 causes a wireless signal 786 to be generated, and the wireless signal 786 is received by the wireless receiver 782 to provide the signal to the control unit 740. The wireless receiver 782 and the wireless electrical device 784 may include paired wireless analog or digital radio frequency (RF) devices, infrared devices, laser devices, ultrasonic devices, or other communication devices operable to communicate the wireless signal 786 from the wireless electrical device 784 to the receiver 782. The wireless electrical input 780 thus may be used to initiate launch of a UAS from a location proximate to the launch site or from over a distance limited by the communications range supported by the wireless receiver 782 and the wireless electrical device 784.

For example, a wireless electrical input 780 comprising infrared devices may be restricted to a relatively small line-of-sight communication range because of limitations of infrared communications. Alternatively, the wireless receiver 782 may include a telephony device responsive to inputs provided by an inbound wireless telephone call having a practically unlimited range. Particularly if the wireless receiver 782 and the wireless electrical device 784 include satellite-based telephone systems, a signal may be presented via the wireless electrical input 780 between locations anywhere in the world—or above the world—provided that the wireless receiver 782 and the wireless electrical device 784 both are within range of telephony satellites that effectively cover the entire planet.

Further alternatively, the wireless electrical input 780 may provide the electrical signal to the control unit 740 via a computer network, such as an Internet. For example, the receiver 782 may include an Internet Protocol enabled radio that is operable to receiving signals from over the Internet from any other Internet-enabled device. Thus, the wireless electrical input 780 may be configured to receive control inputs from any Internet enabled device, ranging from desktop computers to smart phones, that, via the Internet, generate a signal that may be modulated via a wireless Internet connection receivable by an Internet Protocol-enabled radio configured as the receiver 782.

In a particular embodiment, input devices such as the wired electrical device 774 and the wireless electrical device 784 also may be combined with a UAS control system 790 that is configured to activate one or more systems of a UAS to be launched, as shown in FIG. 7. Thus, a device used to initiate launch of the UAS may be combined with a device to power-on a propulsion system of the UAS or to direct operation of the UAS in a single control device.

Flexibility provided by the multi-mode launch control system 730 in initiating launch of a UAS provides may provide wide flexibility both in preparing to launch a UAS and in launching a UAS. For example, because the wireless electrical input 780 enables a UAS to be launched from a remote distance, the UAS may be placed atop a UAS launcher in advance of when the UAS is to be launched to enable personnel preparing the launch time to leave the site before the launch. Thus, if potentially adverse site-specific conditions, including adverse weather conditions or approach of potentially hostile forces, may prevent personnel from being able to launch a UAS from the launch site, the UAS launcher and the UAS may be situated in advance and then be launched at the desired time from a safe distance.

Figure 8:
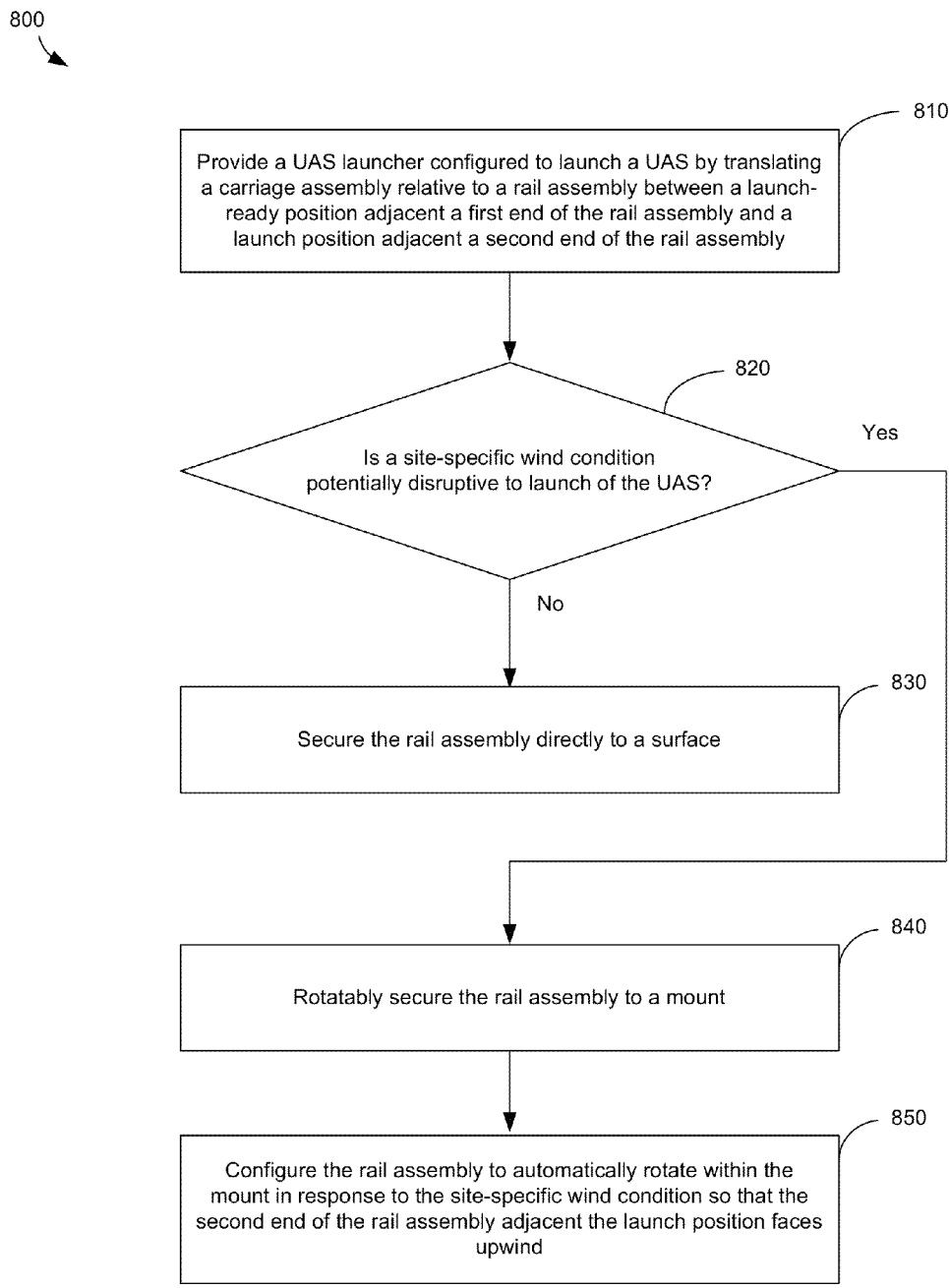
FIG. 8 is a flow diagram of an embodiment of a method of preparing a UAS for launch according to a site-specific wind condition.

FIG. 8 is a flow diagram of an embodiment of a method 800 of preparing a UAS for launch according to a site-specific wind condition. As previously described with reference to FIGS. 1-4C, a UAS launcher 100 may be mounted directly on a surface for launching a UAS. Alternatively, as described with reference to FIG. 5 and FIGS. 6A-6C, it may desirable to employ a UAS launcher, such as the UAS launcher 500, which automatically rotates to face the UAS launcher 500 upwind into a prevailing wind. Using embodiments of the UAS launchers 100 and 500, the deployment of a UAS launcher may be selected based on site-specific wind conditions.

Referring to FIG. 8, at 810, the method 800 commences with providing a UAS launcher configured to launch a UAS by translating a carriage assembly relative to a rail assembly between a launch-ready position adjacent a first end of the rail assembly and a launch position adjacent a second end of the rail assembly. An example of such a combination of a carriage assembly and a rail assembly is described with reference to FIGS. 1 and 5. At 820, it is determined if there is a site-specific wind condition potentially disruptive to launch of the UAS. If it is determined at 820 that there is no site-specific wind condition potentially disruptive to launch of the UAS, at 830, the rail assembly is secured directly to a surface. For example, securing a rail assembly 110 directly to a surface, such as through the user of an anchor assembly 124, is described with reference to FIG. 1.

However, if it is determined that 820 that there is a site-specific wind condition potentially disruptive to launch of the UAS, at 840, the rail assembly is secured to a rotatable mount. For example, securing a rail assembly to a rotatable mount is described with reference to the alternative mount assembly 510 of FIG. 5, where the alternative mount assembly supports the coupling 520 to rotatably receive the rotatable post 530 extending from the clamp 190 of the rail assembly 110. After the rail assembly is secured to the rotatable mount at 840, at 850, the rail assembly is configured to rotate within the rotatable mount in response to the site-specific wind conditions. For example, through the use of the wind vane 540, as described with reference to FIGS. 6A-6C, the prevailing wind impinging up on surfaces of the wind vane 540 automatically causes the rail assembly 110 to rotate so that the second end 106 of the rail assembly 110 adjacent the launch position faces upwind into the direction of the prevailing wind 610 or 620.

Figure 9:
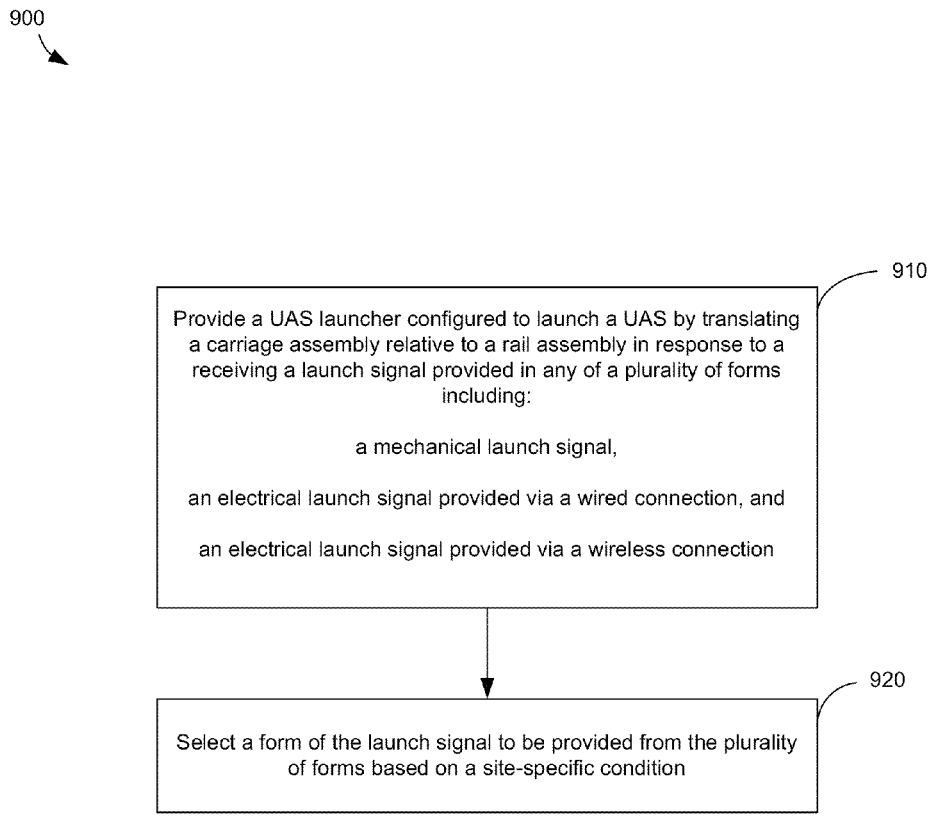
FIG. 9 is a flow diagram of an embodiment of a method of preparing a UAS for launch using a form of launch signal selected based on a site-specific condition.

FIG. 9 is a flow diagram of an embodiment of a method of preparing a UAS for launch using a form of launch signal selected based on a site-specific condition. As previously described with reference to FIG. 7, the multi-mode launch control system 730 provides flexibility in choosing when and where to deploy a UAS launcher because the multi-mode launch control system 730 enables a UAS to be launched using a plurality of forms of launch signals.

Referring to FIG. 9, at 910, the method 900 commences with the providing of a UAS launcher configured to launch a UAS by translating a carriage assembly relative to a rail assembly in response to receiving a launch signal provided in any of a plurality of forms. The plurality of forms, each of which is recognized by the UAS launcher, includes a mechanical launch signal, and electrical launch signal provided via a wired connection, and an electrical launch signal provided via a wireless connection. The multi-mode launch control system 730 is configured to receive the launch signal in any of these forms. At 920, a form of the launch signal to be provided is selected from among the plurality of forms based on a site-specific condition.

For example, if the launch site is located close to potentially hostile forces, it may be undesirable to use a mechanical signal that may necessitate stationing personnel at the launch site. Further, if the site is in a remote location to which a wired connection is unavailable, preparing the UAS for launch may include selecting the user of an electrical signal to be provided via a wireless connection. On the other hand, if a wired connection is unavailable and wireless communication may result in a risk of detection by hostile forces, it may be desirable to prepare the UAS for launch by selecting the use of a mechanical launch signal.

Figure 10:
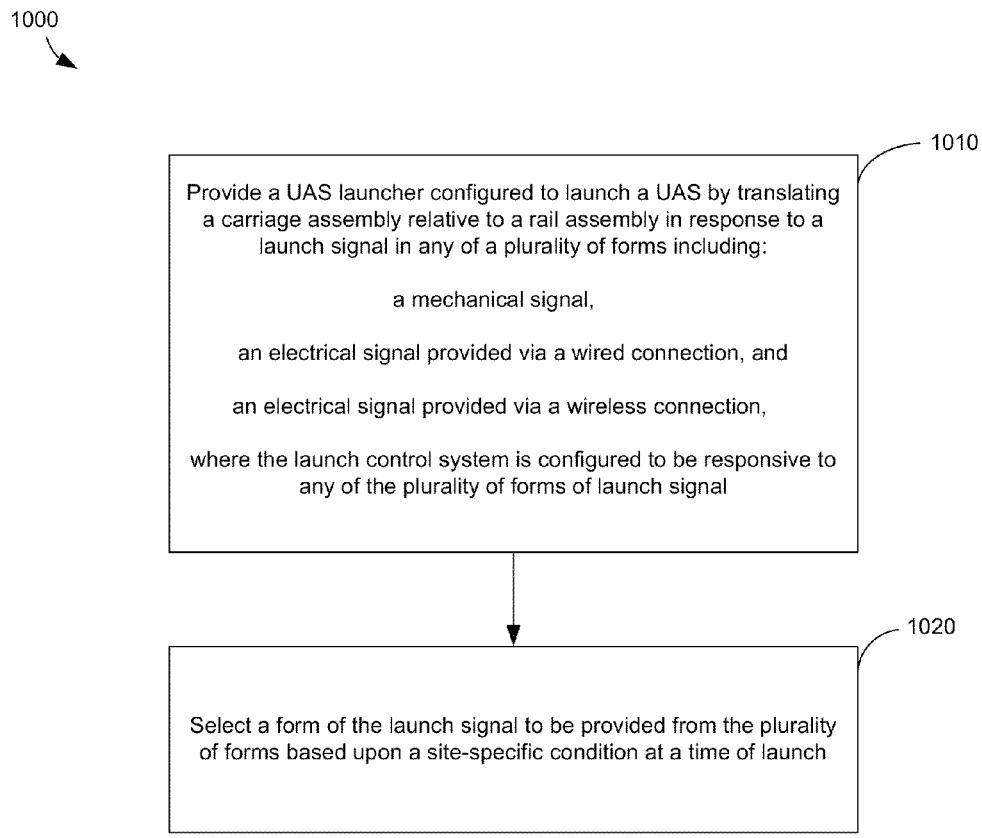
FIG. 10 is a flow diagram of an embodiment of a method of launching a UAS using a form of launch signal selected based on a condition at a time of launch.

FIG. 10 is a flow diagram of an embodiment of a method 1000 of launching a UAS with a release signal selected based on a site-specific condition. As previously described with reference to FIGS. 7 and 9, the multi-mode launch control system 730 provides flexibility in choosing when and where to deploy a UAS launcher because the multi-mode launch control system 730 enables a UAS to be launched using a plurality of forms of launch signals.

Referring to FIG. 10, at 1010, the method 1000 commences with the providing of a UAS launcher configured to launch a UAS by translating carriage assembly relative to a rail assembly in response to receiving a launch signal provided in any of a plurality of forms. The plurality of forms includes a mechanical launch signal, and electrical launch signal provided via a wired connection, and an electrical launch signal provided via a wireless connection. The launch control system is configured to be responsive to any of the plurality of forms of launch signal. At 1020, at the time of launch, the form of the launch signal to be provided is selected from among the plurality of forms based on a site-specific condition.

For example, while it may have been intended to provide for receiving an electrical launch signal to launch the UAS from a remote site using wireless, electrical communications, an electrical storm, communications jamming, or simple equipment failure may prevent receipt of the remote wireless signal. However, if a wired electrical connection is available or personnel are on site to provide a mechanical signal, the UAS may still be launched as desired. Thus, the multi-mode launch control system 730 provides for backup and redundancy in the result of changed conditions at the time of launch.

While the disclosure has been has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Any of various elements or features recited herein is contemplated for use with other features or elements disclosed herein, unless specified to the contrary. Correspondingly, the invention that may be hereinafter claimed is intended to be broadly construed and interpreted, as including all such variations, modifications and alternative embodiments, within its spirit and scope.

The invention claimed is:

1. An unmanned aerial system (UAS) launcher, comprising:
  a rail assembly extending from a first end to a second end and including one or more launch rails, wherein the rail assembly includes an internal track;
  a carriage assembly including:
    a base configured to translate within the internal track of the rail assembly between a launch-ready position adjacent the first end of the rail assembly and a launch position adjacent the second end of the rail assembly;
    a cradle configured to support a UAS; and
    a bracket configured to support the cradle above the base;
  a launch control system secured to the rail assembly and configured to secure the carriage assembly in the launch-ready position until the launch control system receives a launch signal directing the launch control system to release the carriage assembly; and
  one or more elastic members having a first end to-configured to engage the carriage assembly and a second end configured to engage the rail assembly, wherein after the carriage assembly is translated to the launch-ready position, strain is applied to the carriage assembly by the one or more elastic members, and wherein the release of the carriage assembly by the launch control system enables force generated by strain of the one or more elastic members to propel the carriage assembly toward the launch position,
  wherein the UAS launcher has a first configuration wherein the carriage assembly is translated to the launch-ready position and the one or more elastic members are uncoupled from the carriage assembly, and a second configuration wherein the one or more elastic members are coupled to engage the carriage assembly and the rail assembly when the carriage assembly is secured in the launch-ready position.

2. The UAS launcher of claim 1, wherein the rail assembly, the carriage assembly, the launch control system, and the one or more elastic members comprise a man-portable device weighing not more than 25 pounds (11.4 kilograms).

3. The UAS launcher of claim 1, wherein the rail assembly includes two or more launch rails, and wherein the two or more launch rails are joined by a clamp configured to engage external surfaces of the two or more launch rails.

4. The UAS launcher of claim 1, wherein each of the one or more launch rails includes a section of an extruded material.

5. The UAS launcher of claim 1, wherein the rail assembly is generally enclosed on a bottom side and on first and second lateral sides extending from the bottom side, and is partially enclosed on a top side, wherein the top side defines a slot configured to permit the bracket to extend therethrough between the base and the cradle of the carriage assembly as the assembly translates within the internal track.

6. The UAS launcher of claim 5, wherein the plurality of rolling members include lower-facing rolling members configured to rotatably engage a first internal face of the bottom side of the rail assembly and side-facing rolling members configured to rotatably engage second internal faces of lateral sides of the rail assembly as the carriage assembly translates within the internal track of the rail assembly.

7. The UAS launcher of claim 6, further comprising upper-facing rolling members configured to rotatably engage a third internal face of the top side of the rail assembly as the carriage assembly translates within the internal track of the rail assembly.

8. The UAS launcher of claim 1, wherein the rail assembly includes at least one first stop adjacent the first end of the rail assembly and at least second stop adjacent the second end of the rail assembly to restrict movement of the carriage assembly between the launch-ready position and the launch position within the internal track.

9. The UAS launcher of claim 8, further comprising a first shock absorber configured to decelerate the carriage assembly as the carriage assembly reaches the launch-ready position.

10. The UAS launcher of claim 8, further comprising a second shock absorber configured to decelerate the carriage assembly as the carriage assembly reaches the launch position.

11. The UAS launcher of claim 1, wherein the base of the carriage assembly includes a plurality of rolling members configured to rotatably engage the internal track of the rail assembly in orthogonal directions.

12. The UAS launcher of claim 1, wherein the launch control system includes a carriage release mechanism configured to release the carriage assembly in response to receiving the launch signal.

13. The UAS launcher of claim 12, wherein the launch control system is configured to receive the launch signal in the form of a mechanical signal presented by application of a mechanical force.

14. The UAS launcher of claim 12, wherein the carriage release mechanism includes an electromechanical release mechanism and the launch signal includes an electrical launch signal.

15. The UAS launcher of claim 14, wherein the electromechanical release mechanism includes a solenoid.

16. The UAS launcher of claim 14, wherein the electromechanical release mechanism is configured to receive the electrical launch signal via a wired connection.

17. The UAS launcher of claim 16, wherein the wired connection includes an Ethernet connection configured to receive the electrical launch signal via an Ethernet.

18. The UAS launcher of claim 14, wherein the electromechanical release mechanism is configured to receive the electrical launch signal via a wireless connection.

19. The UAS launcher of claim 18, wherein the wireless connection includes an Internet-Protocol enabled receiver configured to receive the electrical launch signal via a wireless Internet connection.

20. The UAS launcher of claim 12, further comprising one or more safety mechanisms configured to prevent an unintended launch.

21. The UAS launcher of claim 20, wherein the one or more safety mechanisms includes a launch rail safety pin configured to be received into at least one of the rail assemblies such that the launch rail safety pin blocks the carriage assembly from translating relative to the rail assembly when the carriage release mechanism releases the carriage assembly until the launch rail safety pin is removed from the at least one of the rail assemblies.

22. The UAS launcher of claim 20, wherein the one or more safety mechanisms includes a carriage release safety mechanism that includes a carriage release safety pin configured to be received into the carriage release assembly to prevent the carriage release assembly from releasing the carriage assembly in response to receiving the launch signal until the carriage release safety pin is removed from the carriage assembly.

23. The UAS launcher of claim 1, wherein the carriage assembly includes at least one first bracket configured to engage the first end of the one or more elastic members and the rail assembly includes at least one second bracket adjacent the second end of the rail system to engage the second end of the one or more elastic members.

24. The UAS launcher of claim 1, further comprising a vertical support assembly configured to be coupled to the rail assembly adjacent to the second end of the rail assembly, wherein the vertical support assembly is configured to support the second end of the rail assembly at a height above a surface.

25. The UAS launcher of claim 24, wherein the vertical support assembly includes one or more struts configured to engage an external surface of the rail assembly.

26. The UAS launcher of claim 24, wherein the one or more struts are rotatably mounted to the external surface of the rail assembly, enabling the one more struts to be rotated between a stowed position and a deployed position.

27. The UAS launcher of claim 24, wherein the vertical support assembly is configured to be adjusted to enable adjustment of the height at which the vertical support assembly supports the second end of the rail assembly above the surface.

28. The UAS launcher of claim 1, further comprising an anchor assembly configured to be coupled to the rail assembly adjacent to the first end of the rail assembly.

29. The UAS launcher of claim 28, wherein the anchor assembly is configured to receive an anchor to secure the rail assembly to a surface.

30. The UAS launcher of claim 1, further comprising a rotatable mounting system including:
a mount configured to engage a surface; and
a coupling secured to the mount and configured to rotatably engage the rail assembly, wherein the rail assembly may be rotated relative to the surface.

31. The UAS launcher of claim 30, wherein the mount includes a tripod.

32. The UAS launcher of claim 30, wherein the rotatable mounting system further comprises a wind vane configured to be secured to the rail assembly adjacent to the first end, wherein the wind vane is configured to be driven downwind by a prevailing wind and to cause the first end of the rail assembly to face in a downwind direction thereby causing the second end of the rail assembly to face in an upwind direction, wherein the second end of the rail assembly automatically rotates to face the second end of the rail assembly into the prevailing wind.

33. The UAS launcher of claim 30, wherein the rotatable mounting system comprises a second man-portable device weighing not more than 25 pounds (11.4 kilograms).

34. The UAS launcher of claim 1, further comprising a UAS control system configured to selectively activate one or more systems of the UAS.

35. The UAS launcher of claim 34, wherein the start control system and the launch control system are configured to be activated by a common control device.

36. An unmanned aerial system (UAS) launcher, comprising:
a rail assembly extending from a first end to a second end and including one or more launch rails;
a carriage assembly configured to support a UAS and to translate the UAS along the rail assembly between a launch-ready position adjacent the first end of the rail assembly and a launch position adjacent the second end of the rail assembly;
one or more elastic members having a first end to-configured to engage the carriage assembly and a second end configured to engage the rail assembly, wherein once the carriage assembly is translated to the launch-ready position, strain is applied to the carriage assembly by the one or more elastic members;
a launch control system secured to the rail assembly and configured to secure the carriage assembly in the launch-ready position until the launch control system receives a launch signal directing the launch control system to release the carriage assembly, and wherein the release of the carriage assembly by the launch control system enables force generated by strain of the one or more elastic members to propel the carriage assembly toward the launch position; and a rotatable mounting system including:

a mount configured to engage a surface;

a coupling secured to the mount and configured to rotatably engage the rail assembly, wherein the rail assembly may be rotated relative to the surface; and a wind vane configured to be secured to the rail assembly adjacent to the first end, wherein the wind vane is configured to be driven downwind by a prevailing wind and to cause the first end of the rail assembly to face in a downwind direction thereby causing the second end of the rail assembly to face in an upwind direction, wherein the rail assembly automatically rotates to face the second end of the rail assembly into the prevailing wind.

37. The UAS launcher of claim 36, wherein the carriage assembly is configured to be translated to the launch-ready position before the one or more elastic members are coupled to engage the carriage assembly and the rail assembly, and wherein the one or more elastic members are coupled to engage the carriage assembly and the rail assembly after the carriage assembly is secured in the launch-ready position.

38. The UAS launcher of claim 36, wherein the mount includes a tripod.

39. The UAS launcher of claim 36, wherein the UAS launcher is a man-portable device weighing not more than 50 pounds (22.7 kilograms).

40. The UAS launcher of claim 36, wherein the rail assembly includes an internal track configured to enable a portion of the carriage assembly to translate within the internal track.

41. The UAS launcher of claim 36, wherein the launch control system includes an electromechanical release mechanism configured to receive the launch signal as an electrical signal.

42. The UAS launcher of claim 41, wherein the electromechanical release mechanism is configured to receive the electrical signal from at least one of a wired connection and a wireless connection.

\* \* \* \* \*

UNITED STATES PATENT AND TRADEMARK OFFICE
CERTIFICATE OF CORRECTION

PATENT NO.        : 8,894,006 B2                                  Page 1 of 1
APPLICATION NO.   : 13/450887
DATED             : November 25, 2014
INVENTOR(S)       : Jones et al.

It is certified that error appears in the above-identified patent and that said Letters Patent is hereby corrected as shown below:

In the Claims

Column 20, line 13, Claim 1: "end to-configured" should read -- end configured --.

Column 22, line 58, Claim 36: "end to-configured" should read -- end configured --.

Signed and Sealed this
Third Day of March, 2015

Michelle K. Lee
*Deputy Director of the United States Patent and Trademark Office*